United States Patent
Hatanaka

(10) Patent No.: US 9,405,154 B2
(45) Date of Patent: Aug. 2, 2016

(54) METHOD FOR MANUFACTURING ORIENTATION MATERIAL, ORIENTATION MATERIAL, METHOD FOR MANUFACTURING RETARDATION MATERIAL, AND RETARDATION MATERIAL

(71) Applicant: NISSAN CHEMICAL INDUSTRIES, LTD., Tokyo (JP)

(72) Inventor: Tadashi Hatanaka, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/427,793

(22) PCT Filed: Sep. 12, 2013

(86) PCT No.: PCT/JP2013/074716
§ 371 (c)(1),
(2) Date: Mar. 12, 2015

(87) PCT Pub. No.: WO2014/042216
PCT Pub. Date: Mar. 20, 2014

(65) Prior Publication Data
US 2015/0253631 A1 Sep. 10, 2015

(30) Foreign Application Priority Data
Sep. 12, 2012 (JP) ................................. 2012-200425

(51) Int. Cl.
*G02B 5/30* (2006.01)
*G02F 1/1337* (2006.01)
(Continued)

(52) U.S. Cl.
CPC ........ *G02F 1/133788* (2013.01); *C09D 133/10* (2013.01); *C09D 133/14* (2013.01);
(Continued)

(58) Field of Classification Search
CPC ................... G02F 1/133788; G02F 1/133711; G02B 5/3083; G02B 27/26; G02B 5/201; C09D 133/10; G03F 7/0005; G03F 7/2006

USPC ........................... 430/321; 359/124, 129, 117
See application file for complete search history.

(56) References Cited

U.S. PATENT DOCUMENTS

| 5,853,818 A | * | 12/1998 | Kwon ................... C08G 77/20 427/259 |
| 2012/0082805 A1 | * | 4/2012 | Hatanaka ............ G02F 1/13363 428/1.2 |

FOREIGN PATENT DOCUMENTS

| JP | H10-104630 A | 4/1998 |
| JP | 10-232365 A | 9/1998 |

(Continued)

OTHER PUBLICATIONS

May 11, 2013 Written Opinion issued in International Patent Application No. PCT/JP2013/074716.
(Continued)

*Primary Examiner* — John A McPherson
(74) *Attorney, Agent, or Firm* — Oliff PLC

(57) ABSTRACT

A highly efficient method for manufacturing an orientation material and a retardation material, and an orientation material and a retardation material. A method for manufacturing an orientation material having a first orientation region and a second orientation region, directions for regulating liquid crystal alignment are different from each other, including: forming a coating film by a cured-film formation composition containing component (A) that is an acrylic copolymer having a photodimerizable moiety and a thermally cross-linkable moiety and a component (B) that is a cross-linking agent onto a substrate; heating the coating film to form a cured film; and performing exposure to polarized light by irradiating a first region for forming the first orientation region and a second region for forming the second orientation region with polarized light having the same polarization direction such that amounts of light exposure are different between the first region and the second region.

11 Claims, 1 Drawing Sheet

(51) Int. Cl.
  *G02B 5/20* (2006.01)
  *C09D 133/10* (2006.01)
  *C09D 133/14* (2006.01)
  *G02B 27/26* (2006.01)
  *G02F 1/13363* (2006.01)

(52) U.S. Cl.
  CPC ............ *G02B 5/201* (2013.01); *G02B 5/3083* (2013.01); *G02F 1/133711* (2013.01); *C08L 2312/00* (2013.01); *G02B 27/26* (2013.01); *G02F 2001/133631* (2013.01); *Y10T 428/24802* (2015.01)

(56) References Cited

FOREIGN PATENT DOCUMENTS

| | | | |
|---|---|---|---|
| JP | 2001-517719 A | 10/2001 | |
| JP | 3611342 B2 | 1/2005 | |
| JP | 2005-049865 A | 2/2005 | |
| JP | 2005-232345 A | 9/2005 | |
| JP | 2008-192773 A | 8/2008 | |
| JP | 2009-058584 A | 3/2009 | |
| WO | 2011/001612 A1 | 1/2011 | |

OTHER PUBLICATIONS

Nov. 5, 2013 International Search Report issued in Application No. PCT/JP2013/074716.

Nov. 5, 2013 Written Opinion issued in International Patent Application No. PCT/JP2013/074716.

\* cited by examiner (a)

(b)

METHOD FOR MANUFACTURING ORIENTATION MATERIAL, ORIENTATION MATERIAL, METHOD FOR MANUFACTURING RETARDATION MATERIAL, AND RETARDATION MATERIAL

TECHNICAL FIELD

The present invention relates to a method for manufacturing an orientation material, an orientation material, a method for manufacturing a retardation material, and a retardation material.

BACKGROUND ART

Recently, in the field of displays such as televisions including liquid crystal panels, as an approach to achieve higher performance, 3D displays with which 3D images can be enjoyed have been developed. In such 3D displays, a stereoscopic image can be displayed by, for example, making the right eye of a viewer see an image for the right eye and making the left eye of the viewer see an image for the left eye.

Various 3D display methods for displaying 3D images can be used, and examples of the methods known as methods requiring no special eyeglasses include a lenticular lens method and a parallax barrier method.

As one of display methods for viewers to see 3D images with eyeglasses, a circularly polarized glasses method, for example, is known (see Patent Document 1, for example).

In a 3D display using the circularly polarized light glasses method, a retardation material is generally arranged on a display element, such as a liquid crystal panel, for forming an image. In this retardation material, two types of retardation regions having different retardation characteristics are regularly arranged to constitute a patterned retardation material. In the present specification, a retardation material thus patterned in which a plurality of retardation regions having different retardation characteristics is arranged is particularly called a patterned retardation material hereinafter.

The patterned retardation material can be fabricated by using a polymerizable liquid crystal that is a liquid crystal having polymerizability and optically patterning a retardation substance including the polymerizable liquid crystal as disclosed in Patent Document 2, for example. In the optical patterning of the retardation substance including a polymerizable liquid crystal, a photo-alignment technique known for forming an orientation material for a liquid crystal of a liquid crystal panel is used. Specifically, a coating film made of a material having photo-alignment properties is provided on a substrate, and two types of polarized beams having different polarization directions are radiated on this coating film. Thus, a photo-alignment film is obtained as an orientation material in which two types of liquid crystal alignment regions are formed and the directions of alignment control of liquid crystals in the regions are different. Onto this photo-alignment film, a retardation substance containing a polymerizable liquid crystal in a solution state is applied to perform alignment of the polymerizable liquid crystal. Subsequently, the polymerizable liquid crystal thus aligned is cured to form a patterned retardation material.

As materials having photo-alignment properties that can be used in orientation material formation using a photo-alignment technique for liquid crystal panels, an acrylic resin and a polyimide resin, for example, are known that have in a side chain thereof a photodimerizable moiety such as a cinnamoyl group and a chalcone group. It is disclosed that these resins exhibit a property of controlling alignment of liquid crystals (hereinafter, also called liquid crystal alignment properties) by polarized UV irradiation (see Patent Document 3 to Patent Document 5).

As described above, in order to obtain a patterned retardation material, an orientation material is formed by employing a photo-alignment technique. In one known method for forming an orientation material, irradiation is conducted with two types of polarized light whose polarization directions are different. In such a method, a photomask is used in a first step of exposing to polarized light, and for example, out of the two types of retardation regions, only a first region of a coating film for forming a first retardation region is irradiated with first polarized light having a specific polarization direction, with a first amount of irradiation. Subsequently, in a second step of exposing to polarized light, the photomask is removed, and the whole area of the coating film including a second region of the coating film for forming a second retardation region is irradiated with second polarized light having a polarization direction that is different from that of the first polarized light, with an amount of irradiation less than the first amount of irradiation, such as with the one-half amount of the first amount of irradiation.

In another method, the whole area of a coating film is irradiated with a first polarized light in a first step of exposing to polarized light, with a first amount of irradiation. Subsequently, in a second step of exposing to polarized light, a photomask is used, and for example, out of the two types of retardation regions, only a first region of a coating film for forming a first retardation region is irradiated with second polarized light having a polarization direction that is different from that of the first polarized light, with an amount of irradiation more than the first amount of irradiation, such as with the amount of twice of the first amount of irradiation.

FIGS. 2A and 2B are figures illustrating a conventional method for manufacturing an orientation material. FIG. 2A is a figure illustrating a first step of exposing to polarized light, and FIG. 2B is a figure illustrating a second step of exposing to polarized light.

As shown in FIGS. 2A and 2B, a method called a mask alignment method has been known as another method for manufacturing an orientation material.

In the mask alignment method shown in FIGS. 2A and 2B, a step of exposing to polarized light is conducted at least two times, and every time a photomask having a pattern different is used.

Specifically, in the mask alignment method, firstly a coating film 1001 made of a material having photo-alignment properties is provided on a substrate 1000 that serves as a supporting material. A photomask 1002 is used in a first step of exposing to polarized light, and for example, out of the two types of retardation regions in a retardation material, only a first region of the coating film 1001 for forming a first retardation region is irradiated with first polarized light 1004 having a specific polarization direction, with a first amount of irradiation. Subsequently, in a second step of exposing to polarized light, a photomask 1003 having a different pattern is used. After positioning, only a second region of the coating film 1001 for forming a second retardation region in the retardation material is irradiated with second polarized light 1005 having a polarization direction that is different from that of the first polarized light 1004. The amount of irradiation of the second polarized light 1005 can be comparable to that of the first polarized light 1004, and thus exposure steps with polarized light irradiation is made efficient.

However, for this prior art technique, the mask alignment method, two photomasks have to be prepared, and the mask alignment is highly difficult to perform, and thus yield is expected to be low.

PRIOR ART DOCUMENTS

Patent Documents

Patent Document 1: Japanese Patent Application Publication No. 10-232365 (JP 10-232365 A)
Patent Document 2: Japanese Patent Application Publication No. 2005-49865 (JP 2005-49865 A)
Patent Document 3: Japanese Patent No. 3611342 (JP 3611342 B2)
Patent Document 4: Japanese Patent Application Publication No. 2009-058584 (JP 2009-058584 A)
Patent Document 5: Published Japanese Translation of PCT Application No. 2001-517719 (JP 2001-517719 T)

SUMMARY OF THE INVENTION

Problem to be Solved by the Invention

As described above, for manufacturing a patterned retardation material, an orientation material is manufactured by employing a photo-alignment technique, and then a formation of a patterned retardation material is formed by using the orientation material.

In this case, two times or more of polarized light exposures are required in any of the above-described conventional methods for manufacturing an orientation material. Thus, the exposure steps take longer time, which causes low efficiency of manufacture of an orientation material and a patterned retardation material.

Accordingly, a method for manufacturing an orientation material is desired by which an orientation material can be highly efficiently manufactured.

The present invention has been made based on the above-described findings and study results. An object of the present invention is to provide a method for manufacturing an orientation material by which an orientation material can be highly efficiently formed, and to provide an orientation material by using the method for manufacturing an orientation material.

Another object of the present invention is to provide a highly efficient method for manufacturing a retardation material including a highly efficient method for manufacturing an orientation material, and to provide a retardation material by using the method for manufacturing a retardation material.

Other objects and advantages of the present invention will be apparent from the following description.

Means for Solving the Problem

A first aspect of the present invention relates to a method for manufacturing an orientation material having a first orientation region and a second orientation region, in which directions for regulating liquid crystal alignment are different from each other, the method characterized by comprising the steps of:
  forming a coating film by applying a cured-film formation composition containing a component (A) that is an acrylic copolymer having a photodimerizable moiety and a thermally cross-linkable moiety and a component (B) that is a cross-linking agent onto a substrate;
  heating the coating film to form a cured film on the substrate; and
  performing exposure to polarized light by irradiating a first region for forming the first orientation region and a second region for forming the second orientation region of the cured film at the same time with polarized light having the same polarization direction such that amounts of light exposure are different between the first region and the second region.

In the first aspect of the present invention, the photodimerizable moiety of the component (A) of the cured-film formation composition is preferably a cinnamoyl group.

In the first aspect of the present invention, the thermally cross-linkable moiety of the component (A) of the cured-film formation composition is preferably a hydroxy group.

In the first aspect of the present invention, the cross-linking agent of the component (B) of the cured-film formation composition is preferably a cross-linking agent having a methylol group or an alkoxymethylol group.

In the first aspect of the present invention, the cured film is preferably a film in which a direction for regulating liquid crystal alignment varies depending on an amount of light exposure in the step of performing exposure to polarized light In the first aspect of the present invention, the cured film is preferably a film in which a direction for regulating liquid crystal alignment varies depending on whether an amount of exposure to polarized light is more or less than a standard amount of light.

In the first aspect of the present invention, in the step of performing exposure to polarized light, a photomask formed so as to have a transmissive region and a semi-transmissive region whose light transmittance is lower than that of the transmissive region is used so that each of the first region and the second region of the cured film is exposed to polarized light such that amounts of light exposure are different between the first region and the second region.

In the first aspect of the present invention, the cured-film formation composition preferably contains a low molecular alignment component as a component (D).

A second aspect of the present invention relates to an orientation material characterized by being obtained by the method for manufacturing an orientation material as described in the first aspect of the present invention.

A third aspect of the present invention relates to a method for manufacturing a retardation material characterized by using the orientation material as described in the second aspect of the present invention.

A fourth aspect of the present invention relates to a retardation material characterized by being obtained by the method for manufacturing a retardation material as described in the third aspect of the present invention.

Effects of the Invention

According to the first aspect of the present invention, it is possible to manufacture an orientation material highly efficiently.

According to the second aspect of the present invention, an orientation material that is manufactured highly efficiently can be obtained.

According to the third aspect of the present invention, it is possible to manufacture a retardation material highly efficiently.

According to the fourth aspect of the present invention, a retardation material that is manufactured highly efficiently can be obtained.

BRIEF DESCRIPTION OF THE DRAWINGS

FIG. 2A is a figure illustrating a first step of exposing to polarized light, and FIG. 2B is a figure illustrating a second step of exposing to polarized light.

MODES FOR CARRYING OUT THE INVENTION

Figure 1:
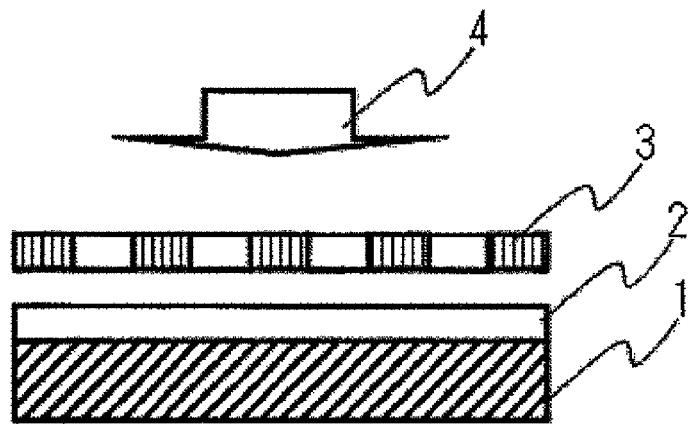
FIG. 1 is a figure schematically illustrating a method for manufacturing an orientation material of an embodiment of the present invention.
Figure 2:
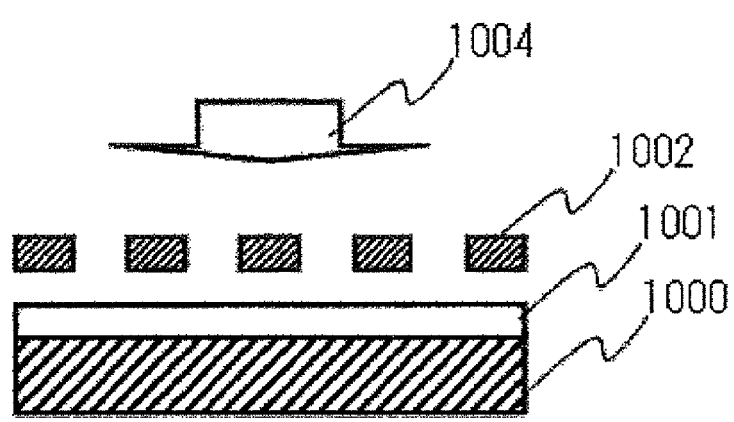
FIG. 2 is a figure illustrating a conventional method for manufacturing an orientation material.
Figure 2:
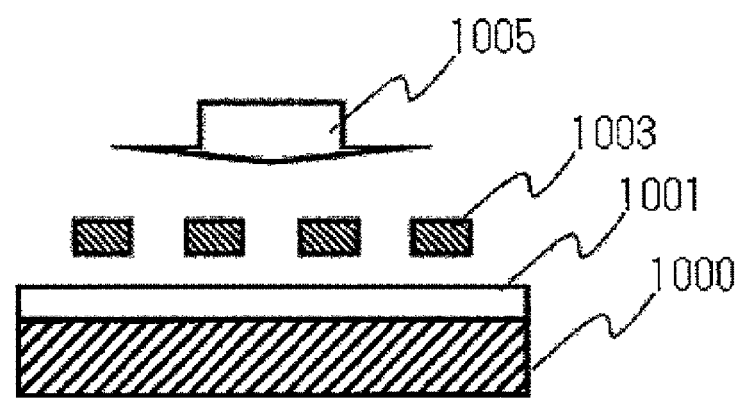

As described above, a highly efficient photo-alignment technique and a cured-film formation composition used for forming an orientation material are desired so that highly efficient manufacture of a patterned retardation material and the like is achieved.

As a result of intensive study to meet such a demand, the inventors of the present invention have found that a cured film obtained from a cured-film formation composition with a specific composition shows controllability for liquid crystal alignment, which is a property of regulating liquid crystal alignment depending on the amount of exposure to polarized light, and also shows a characteristic that a direction for regulating liquid crystal alignment varies depending on the amount of light exposure. In other words, the cured film used in the present invention can be a film in which a direction for regulating liquid crystal alignment varies depending on the amount of exposure to polarized light.

A result of further study showed that the cured film obtained from the cured-film formation composition used in the present invention can be controlled such that the direction for regulating liquid crystal alignment varies depending on whether an amount of exposure to polarized light is more or less than a standard amount of light. Moreover, it has been showed that the cured film obtained from the cured-film formation composition used in the present invention can be controlled such that the direction for regulating liquid crystal alignment varies by an angle of about 90 degrees depending on whether an amount of exposure to polarized light is more or less than the standard amount of light.

Hereinafter, a cured-film formation composition used in the present invention will be explained in detail with specific examples, and a method for manufacturing a cured film and an orientation material by using the cured-film formation composition, a method for manufacturing a retardation material formed by using the orientation material, and the like will also be explained in detail.

<Cured-Film Formation Composition>

The cured-film formation composition of the present embodiment of the present invention is a thermosetting cured-film formation composition having photo-alignment properties, which contains an acrylic copolymer having a photodimerizable moiety and a thermally cross-linkable moiety of the component (A) and a cross-linking agent of the component (B). In addition to the component (A) and the component (B), the cured-film formation composition of the present embodiment may further contain a cross-linking catalyst as a component (C). As will be described later, a low molecular alignment component can also be contained as a component (D), in order to control the direction for regulating liquid crystal alignment with the lower amount of light exposure. Unless the effects of the present invention are impaired, the cured-film formation composition may contain other components. For example, another polymer component can be contained as a component (E). A sensitizer can also be contained as a component (F). Further, a solvent and other additives can be contained.

Hereinafter, each of the components will be explained in detail.

[Component (A)]

The component (A) is an acrylic copolymer having a photodimerizable moiety and a thermally cross-linkable moiety.

In the present invention, the acrylic copolymer is referred to as a copolymer obtained by polymerizing monomers having unsaturated double bonds, such as acrylic acid ester, methacrylic acid ester, and styrene.

The acrylic copolymer having a photodimerizable moiety and a thermally cross-linkable moiety (hereinafter, also called a specific copolymer) of the component (A) may be any acrylic copolymer having such a structure, and the skeleton of the main chain and the type of the side chain of a polymer constituting the acrylic copolymer are not limited to particular ones.

Examples of the photodimerizable moiety include a cinnamoyl group, a chalcone group, a coumarin group, and an anthracene group. Among them, the cinnamoyl group is preferred because of its high transparency in the visible light range and high photodimerization reactivity. A more preferred cinnamoyl group is a structure of Formula [1] or Formula [2] below.

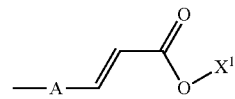

[1]

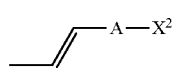

[2]

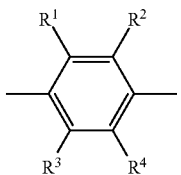

[A1]

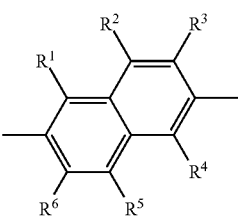

[A2]

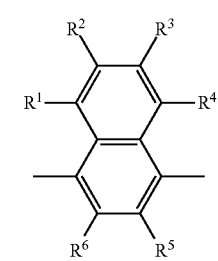

[A3]

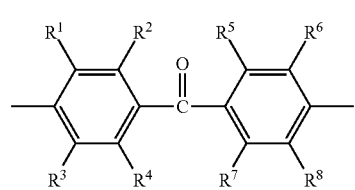

[A4]

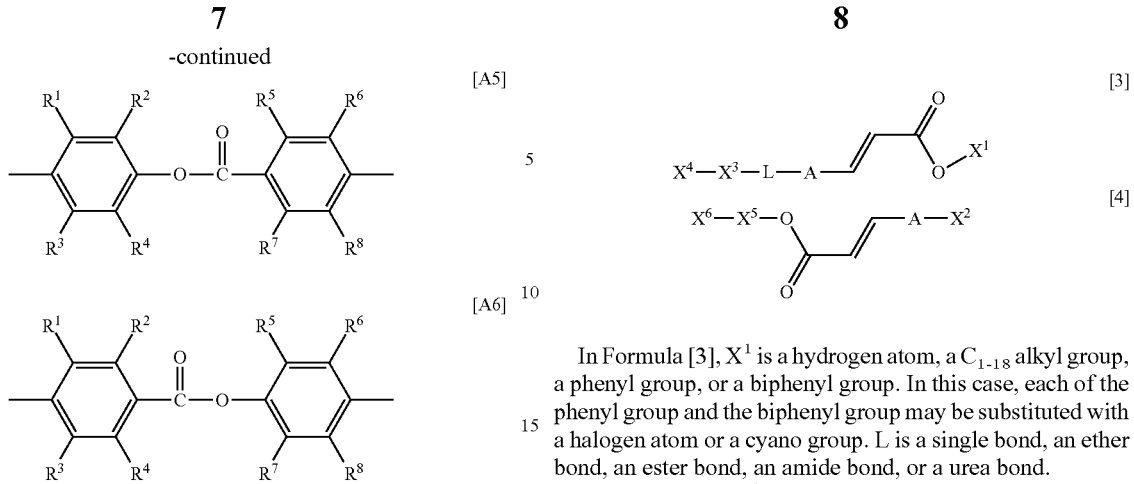

In Formula [1], $X^1$ is a hydrogen atom, a $C_{1-18}$ alkyl group, a phenyl group, or a biphenyl group. In this case, the phenyl group or the biphenyl group may be substituted with a halogen atom or a cyano group.

In Formula [2], $X^2$ is a hydrogen atom, a cyano group, a $C_{1-18}$ alkyl group, a phenyl group, a biphenyl group, or a cyclohexyl group. In this case, the $C_{1-18}$ alkyl group, the phenyl group, the biphenyl group, or the cyclohexyl group may be bonded to A through a single bond, an ether bond, an ester bond, an amide bond, or a urea bond.

In Formulae [1] and [2], A refers to any of Formula [A1], Formula [A2], Formula [A3], Formula [A4], Formula [A5], and Formula [A6].

In Formulae [A1], [A2], [A3], [A4], [A5], and [A6], each of $R^1$, $R^2$, $R^3$, $R^4$, $R^5$, $R^6$, $R^7$, and $R^8$ is independently a hydrogen atom, a $C_{1-4}$ alkyl group, a $C_{1-4}$ alkoxy group, a halogen atom, a trifluoromethyl group, or a cyano group.

The thermally cross-linkable moiety is a moiety bonded to a cross-linking agent being the component (B) upon heating, and specific examples thereof include a hydroxy group, a carboxy group, and a glycidyl group.

The acrylic copolymer of the component (A) has a weight-average molecular weight of preferably 3,000 to 200,000. An excessively high weight-average molecular weight exceeding 200,000 may reduce the solubility in solvent, so that the handling property may deteriorate, whereas an excessively low weight-average molecular weight below 3,000 may cause insufficient curing during heat curing, so that the solvent resistance and/or the heat resistance may decrease.

A simple method for synthesizing the acrylic copolymer having a photodimerizable moiety and a thermally cross-linkable moiety of the component (A) is a method for copolymerizing a monomer having a photodimerizable moiety and a monomer having a thermally cross-linkable moiety.

Examples of the monomer having a photodimerizable moiety include a monomer having a cinnamoyl group, a chalcone group, a coumarin group, or an anthracene group. Among them, the monomer having a cinnamoyl group is particularly preferred because of its high transparency in the visible light range and high photodimerization reactivity.

Among them, a monomer having a cinnamoyl group having a structure of Formula [1] or Formula [2] is more preferred. Specific examples of such a monomer include a monomer of Formula [3] or Formula [4] below.

In Formula [3], $X^1$ is a hydrogen atom, a $C_{1-18}$ alkyl group, a phenyl group, or a biphenyl group. In this case, each of the phenyl group and the biphenyl group may be substituted with a halogen atom or a cyano group. L is a single bond, an ether bond, an ester bond, an amide bond, or a urea bond.

In Formula [4], $X^2$ is a hydrogen atom, a cyano group, a $C_{1-18}$ alkyl group, a phenyl group, a biphenyl group, or a cyclohexyl group. In this case, the $C_{1-18}$ alkyl group, the phenyl group, the biphenyl group, or the cyclohexyl group may be bonded to A through a single bond, an ether bond, an ester bond, an amide bond, or a urea bond.

In Formulae [3] and [4], each of $X^3$ and $X^5$ is independently a single bond, a $C_{1-20}$ alkylene group, an aromatic ring, or an aliphatic ring. Here, the $C_{1-20}$ alkylene group may be branched or linear.

In Formulae [3] and [4], each of $X^4$ and $X^6$ is a polymerizable group. Specific examples of the polymerizable group include an acryloyl group, a methacryloyl group, a styrene group, a maleimide group, an acrylamide group, and a methacrylamide group.

In Formulae [3] and [4], A refers to any of Formula [A1], Formula [A2], Formula [A3], Formula [A4], Formula [A5], and Formula [A6] similarly to the above description.

Examples of the monomer having a thermally cross-linkable moiety include a monomer having a hydroxy group, such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2,3-dihydroxypropyl acrylate, 2,3-dihydroxypropyl methacrylate, diethylene glycol monoacrylate, diethylene glycol monomethacrylate, caprolactone 2-(acryloyloxy)ethyl ester, caprolactone 2-(methacryloyloxy)ethyl ester, poly(ethylene glycol)ethyl ether acrylate, poly(ethylene glycol)ethyl ether methacrylate, 5-acryloyloxy-6-hydroxynorbornene-2-carboxylic-6-lactone, and 5-methacryloyloxy-6-hydroxynorbornene-2-carboxylic-6-lactone; a monomer having a carboxy group, such as acrylic acid, methacrylic acid, crotonic acid, mono-(2-(acryloyloxy)ethyl)phthalate, mono-(2-(methacryloyloxy)ethyl)phthalate, N-(carboxyphenyl)maleimide, N-(carboxyphenyl)methacrylamide, and N-(carboxyphenyl)acrylamide; a monomer having a phenolic hydroxy group, such as hydroxy styrene, N-(hydroxyphenyl)methacrylamide, N-(hydroxyphenyl)acrylamide, N-(hydroxyphenyl)maleimide, and N-(hydroxyphenyl)maleimide; a monomer having a glycidyl group, such as glycidyl methacrylate and glycidyl acrylate; and a monomer having an alkoxysilyl group, such as methacryloyloxypropyltrimethoxysilane, methacryloyloxypropyltriethoxysilane, acryloyloxypropyltrimethoxysilane, and acryloyloxypropyltriethoxysilane.

The monomer having a photodimerizable moiety and the monomer having a thermally cross-linkable moiety, which are used to obtain the specific copolymer, are preferably used in an amount of 40% by mass to 95% by mass for the monomer having a photodimerizable moiety, and in an amount of 5% by mass to 60% by mass for the monomer having a thermally cross-linkable moiety. With the monomer having a photodimerizable moiety in a content of 40% by mass or more, highly sensitive, good liquid crystal alignment can be imparted. While with the monomer having a photodimerizable moiety in a content of 95% by mass or less, satisfactory thermosetting properties can be imparted, and highly sensitive, good liquid crystal alignment can be maintained.

When the specific copolymer is obtained in the present embodiment, a monomer (hereinafter, also called a monomer having a nonreactive functional group) copolymerizable with a monomer having a photodimerizable moiety and a thermally cross-linkable moiety (hereinafter, also called a specific functional group) can concomitantly be used.

Specific examples of such a monomer include an acrylic acid ester compound, a methacrylic acid ester compound, a maleimide compound, an acrylamide compound, acrylonitrile, maleic acid anhydride, a styrene compound, and a vinyl compound.

The monomer of above can be exemplified by the specific examples below, but the present invention is not limited to these.

Examples of the acrylic acid ester compound include methyl acrylate, ethyl acrylate, isopropyl acrylate, benzyl acrylate, naphthyl acrylate, anthryl acrylate, anthrylmethyl acrylate, phenyl acrylate, glycidyl acrylate, 2,2,2-trifluoroethyl acrylate, tert-butyl acrylate, cyclohexyl acrylate, isobornyl acrylate, 2-methoxyethyl acrylate, methoxytriethylene glycol acrylate, 2-ethoxyethyl acrylate, 2-aminoethyl acrylate, tetrahydrofurfuryl acrylate, 3-methoxybutyl acrylate, 2-methyl-2-adamantyl acrylate, 2-propyl-2-adamantyl acrylate, 8-methyl-8-tricyclodecyl acrylate, and 8-ethyl-8-tricyclodecyl acrylate.

Examples of the methacrylic acid ester compound include methyl methacrylate, ethyl methacrylate, isopropyl methacrylate, benzyl methacrylate, naphthyl methacrylate, anthryl methacrylate, anthrylmethyl methacrylate, phenyl methacrylate, glycidyl methacrylate, 2,2,2-trifluoroethyl methacrylate, tert-butyl methacrylate, cyclohexyl methacrylate, isobornyl methacrylate, 2-methoxyethyl methacrylate, methoxytriethylene glycol methacrylate, 2-ethoxyethyl methacrylate, 2-aminomethyl methacrylate, tetrahydrofurfuryl methacrylate, 3-methoxybutyl methacrylate, 2-methyl-2-adamantyl methacrylate, γ-butyrolactone methacrylate, 2-propyl-2-adamantyl methacrylate, 8-methyl-8-tricyclodecyl methacrylate, and 8-ethyl-8-tricyclodecyl methacrylate.

Examples of the vinyl compound include methylvinyl ether, benzylvinyl ether, vinyl naphthalene, vinyl carbazole, allylglycidyl ether, 3-ethenyl-7-oxabicyclo[4.1.0]heptane, 1,2-epoxy-5-hexene, and 1,7-octadiene monoepoxide.

Examples of the styrene compound include styrene, methylstyrene, chlorostyrene, and bromostyrene.

Examples of the maleimide compound include maleimide, N-methylmaleimide, N-phenylmaleimide, and N-cyclohexylmaleimide.

Although the method for obtaining the specific copolymer used in the present embodiment is not limited to a particular method, the specific copolymer can be obtained, for example, by subjecting the monomer having a specific functional group, the monomer having a nonreactive functional group if desired, and a polymerization initiator or the like to a polymerization reaction in a solvent in which they coexist at a temperature of 50° C. to 110° C. The solvent used herein is not limited as long as the solvent can dissolve the monomer having a specific functional group, the monomer having a nonreactive functional group if desired, and the polymerization initiator or the like. Specific examples of the solvent will be recited in [Solvent] described later.

The specific copolymer thus obtained is generally in a solution state and is dissolved in the solvent.

A solution of the specific copolymer thus obtained is poured into diethyl ether, water, or the like with stirring and the specific copolymer is reprecipitated. The precipitate thus obtained is filtered and washed, and then is dried at room temperature or dried by heating under atmospheric pressure or reduced pressure. Thus, a powder of the specific copolymer can be prepared. By such an operation, the polymerization initiator and/or an unreacted monomer that coexist with the specific copolymer can be removed, and consequently the powder of the purified specific copolymer can be obtained. If the specific polymer cannot be sufficiently purified by one operation, the obtained powder may be redissolved in a solvent, followed by repeating the above-described operation.

In the present embodiment, the powder of the specific copolymer may be used as it is, or the powder may be used by re-dissolving, for example, in a solvent to be described later in a solution state.

In the present embodiment, the acrylic copolymer of the component (A) may be a mixture of a plurality of types of the specific copolymers.

[Component (B)]

The component (B) contained in the cured-film formation composition of the present embodiment of the present invention is a cross-linking agent bonded to a thermally cross-linkable moiety of the specific copolymer being the component (A). Examples of the cross-linking agent include an epoxy compound, a methylol compound, an alkoxysilane compound, and an isocyanato compound. Among them, the methylol compound is preferred.

Specific examples of the methylol compound include alkoxymethylated glycoluril, alkoxymethylated benzoguanamine, and alkoxymethylated melamine.

Specific examples of alkoxymethylated glycoluril include 1,3,4,6-tetrakis(butoxymethyl)glycoluril, 1,3,4,6-tetrakis(hydroxymethyl)glycoluril, 1,3-bis(hydroxymethyl)urea, 1,1,3,3-tetrakis(butoxymethyl)urea, 1,1,3,3-tetrakis(methoxymethyl)urea, 1,3-bis(hydroxymethyl)-4,5-dihydroxy-2-imidazolinone, and 1,3-bis(methoxymethyl)-4,5-dimethoxy-2-imidazolinone. Examples of commercially available products include glycoluril compounds (the product name: Cymel 1170 and Powderlink 1174), a methylated urea resin (the product name: UFR65), and butylated urea resins (the product name: UFR300, U-VAN10S60, U-VAN10R, and U-VAN11HV) manufactured by Mitsui Cytec, Ltd.; and urea/formaldehyde resins (highly condensed type, the product name: BECKAMINE J-300S, BECKAMINE P-955, and BECKAMINE N) manufactured by Dainippon Ink and Chemicals, Incorporated.

Specific examples of alkoxymethylated benzoguanamine include tetramethoxymethyl benzoguanamine. Examples of commercially available products include the product name: Cymel 1123 manufactured by Mitsui Cytec, Ltd.; and the product name: NIKALAC BX-4000, NIKALAC BX-37, NIKALAC BL-60, and NIKALAC BX-55H, manufactured by SANWA Chemical Co., Ltd.

Specific examples of alkoxymethylated melamine include hexamethoxymethyl melamine. Examples of commercially available products include methoxymethyl type melamine compounds (the product name: Cymel 300, Cymel 301, Cymel 303, and Cymel 350) and butoxymethyl type melamine compounds (the product name: Mycoat 506 and Mycoat 508) manufactured by Mitsui Cytec, Ltd.; and methoxymethyl type melamine compounds (the product name: NIKALAC MW-30, NIKALAC MW-22, NIKALAC MW-11, NIKALAC MS-001, NIKALAC MX-002, NIKA- LAC MX-730, NIKALAC MX-750, and NIKALAC MX-035) and butoxymethyl type melamine compounds (the product name: NIKALAC MX-45, NIKALAC MX-410, and NIKALAC MX-302) manufactured by SANWA Chemical Co., Ltd.

The methylol compound may also be a compound obtained by condensing a melamine compound, a urea compound, a glycoluril compound, or a benzoguanamine compound in which the hydrogen atom of an amino group is substituted with a methylol group or an alkoxymethyl group. Examples of such compounds include a high molecular weight compound manufactured from a melamine compound or a benzoguanamine compound described in U.S. Pat. No. 6,323, 310. Examples of commercially available products of the melamine compound include the product name: Cymel 303 manufactured by Mitsui Cytec, Ltd.; and examples of commercially available products of the benzoguanamine compound include the product name: Cymel 1123 manufactured by Mitsui Cytec, Ltd.

As the component (B), a polymer manufactured with an acrylamide compound or a methacrylamide compound, which are substituted with a hydroxymethyl group or an alkoxymethyl group such as N-hydroxymethyl acrylamide, N-methoxymethyl methacrylamide, N-ethoxymethyl acrylamide, and N-butoxymethyl methacrylamide, may also be used.

Examples of such a polymer include poly(N-butoxymethyl acrylamide), poly(N-ethoxymethyl acrylamide), poly(N-methoxymethyl acrylamide), poly(N-hydroxymethyl acrylamide), a copolymer of N-butoxymethyl acrylamide and styrene, a copolymer of N-hydroxymethyl methacrylamide and methyl methacrylate, a copolymer of N-ethoxymethyl methacrylamide and benzyl methacrylate, and a copolymer of N-butoxymethyl acrylamide, benzyl methacrylate, and 2-hydroxypropyl methacrylate. A weight-average molecular weight of such a polymer is, for example 1,000 to 500,000, for example 2,000 to 200,000, for example 3,000 to 150,000, and for example 3,000 to 50,000.

These cross-linking agents may be used singly or in combination of two or more types thereof.

The cross-linking agent of the component (B) in the cured-film formation composition of the present embodiment of the present invention is preferably contained in an amount of 10 parts by mass to 150 parts by mass, and more preferably 15 parts by mass to 130 parts by mass, based on 100 parts by mass of the component (A). When this proportion is excessively low, the solvent resistance and/or the heat resistance of a cured film obtained from the cured-film formation composition of the present embodiment decrease(s), and the sensitivity thereof during photo-alignment process decreases, while when this proportion is excessively high, the photo-alignment properties decrease, and the preservation stability may deteriorate.

[Component (C)]

The cured-film formation composition of the present embodiment of the present invention may contain a cross-linking catalyst as the component (C). Examples of the cross-linking catalyst being the component (C) include an acid and a thermal acid generator. This component (C) is effective in promoting thermosetting properties of the cured-film formation composition of the present embodiment of the present invention.

In cases where an acid or a thermal acid generator is used as the component (C), the component (C) is not limited as long as the component (C) is a sulfonic acid group-containing compound, hydrochloric acid or a salt thereof, or a compound that thermally decomposes to generate an acid during prebaking or postbaking, that is, a compound that thermally decomposes to generate an acid at a temperature of 80° C. to 250° C.

Examples of such a compound include hydrochloric acid; and a sulfonic acid such as methanesulfonic acid, ethanesulfonic acid, propanesulfonic acid, butanesulfonic acid, pentanesulfonic acid, octanesulfonic acid, benzenesulfonic acid, p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H,1H,2H,2H-perfluorooctanesulfonic acid, perfluoro(2-ethoxyethane)sulfonic acid, pentafluoroethanesulfonic acid, nonafluorobutane-1-sulfonic acid, and dodecylbenzenesulfonic acid, and a hydrate or a salt thereof.

Examples of the compound generating an acid by heat include bis(tosyloxy)ethane, bis(tosyloxy)propane, bis(tosyloxy)butane, p-nitrobenzyl tosylate, o-nitrobenzyl tosylate, 1,2,3-phenylene tris(methylsulfonate), p-toluenesulfonic acid pyridinium salt, p-toluenesulfonic acid morphonium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-tosylate, N-ethyl-4-toluenesulfonamide, and compounds of Formulae [PAG-1] to [PAG-41] below.

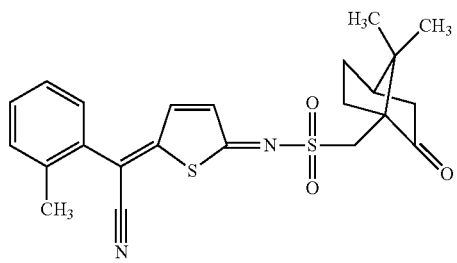

[PAG-1]

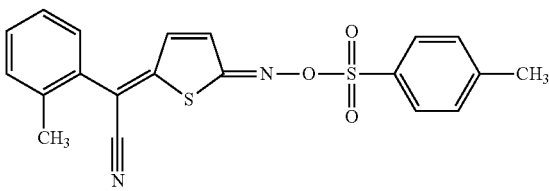

[PAG-2]

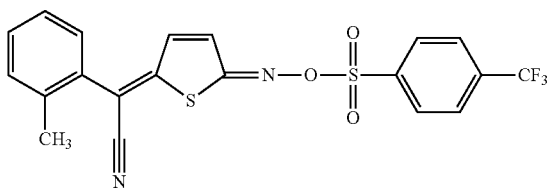

[PAG-3]

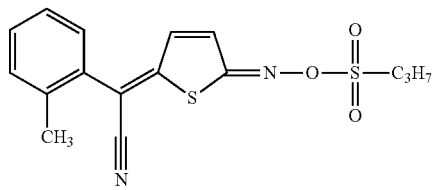

[PAG-4]

[PAG-5] [PAG-6] [PAG-7] [PAG-8] [PAG-9] [PAG-10] [PAG-11] [PAG-12] [PAG-13] [PAG-14] [PAG-15] [PAG-16] [PAG-17] [PAG-18] [PAG-19] [PAG-20] [PAG-21] [PAG-22] [PAG-23] [PAG-24]

[PAG-25] 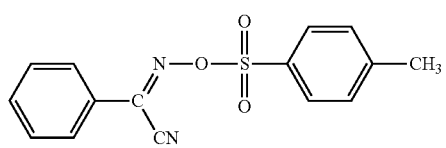
[PAG-26] 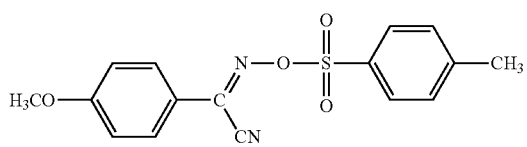
[PAG-27] 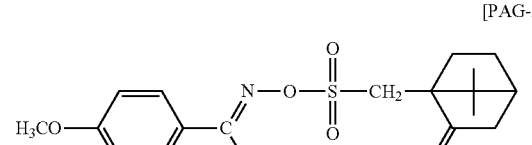
[PAG-28] 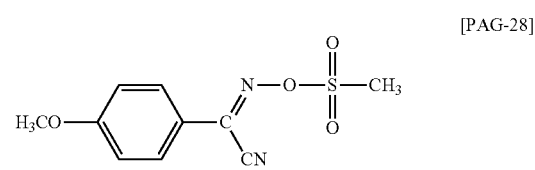
[PAG-29] 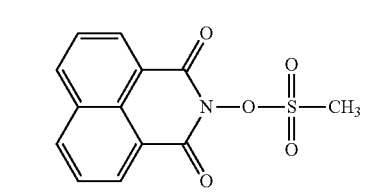
[PAG-30] 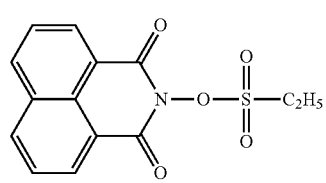
[PAG-31] 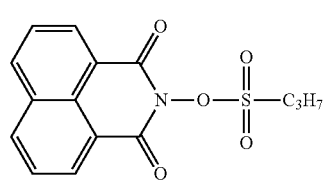
[PAG-32] 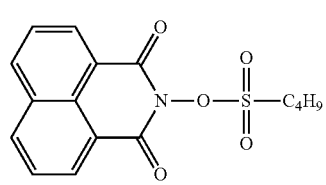
[PAG-33] 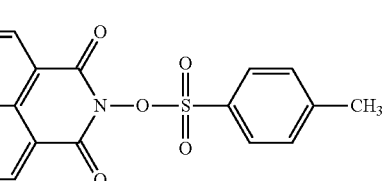
[PAG-34] 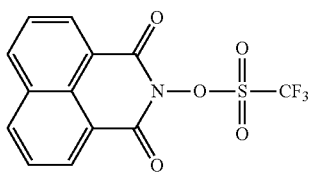
[PAG-35] 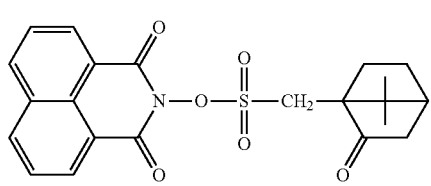
[PAG-36] 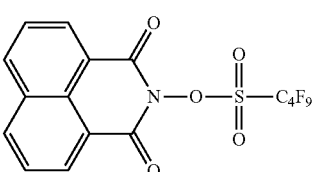
[PAG-37] 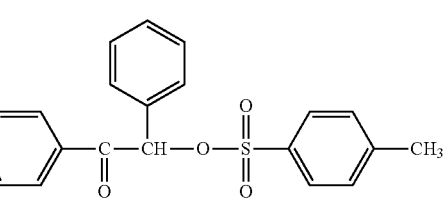
[PAG-38] 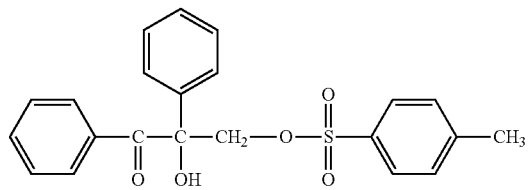
[PAG-39] 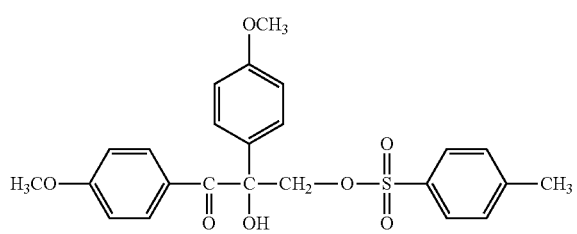
[PAG-40] 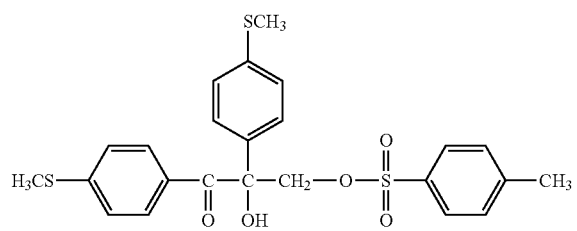

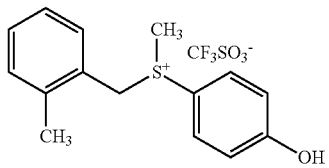
[PAG-41]

The component (C) in the cured-film formation composition of the present embodiment of the present invention is preferably contained in an amount of 0.01 part by mass to 10 parts by mass, more preferably 0.05 part by mass to 8 parts by mass, and still more preferably 0.1 part by mass to 6 parts by mass, based on 100 parts by mass of the component (A). With the component (C) contained in an amount of 0.01 part by mass or more, satisfactory thermosetting properties and the solvent resistance can be imparted, and high sensitivity to exposure can also be imparted. With the component (C) contained in an amount of 10 parts by mass or less, the preservation stability of the cured-film formation composition can be improved.

[Component (D)]

The cured-film formation composition of the present embodiment of the present invention may contain a low molecular alignment component as the component (D). A cured film of the present embodiment obtained by using the cured-film formation composition of the present embodiment has a characteristic that the direction for regulating liquid crystal alignment varies depending on the amount of light exposure. In this case, in the cured film of the present embodiment, there is a standard amount of light, which is a value having a certain range, to change the direction for regulating liquid crystal alignment, and the cured film has a characteristic that the direction for regulating liquid crystal alignment varies depending on whether an amount of exposure to polarized light is more or less than the standard amount of light. In other words, each of the cured films of the present embodiment has a threshold with a certain range, and the direction for regulating liquid crystal alignment can be selected by selecting an amount of exposure to polarized light more than the threshold or an amount of exposure to polarized light less than the threshold and performing exposure.

In the present embodiment, the cured-film formation composition for forming the cured film, which has the above-described characteristics, contains the low molecular alignment component being the component (D), and thus the standard amount of light on exposure to change the direction for regulating liquid crystal alignment described above can be a smaller value. As a result, the cured film of the present embodiment can be manufactured highly efficiently.

In the cured-film formation composition of the present embodiment, the low molecular alignment component being the component (D) can be a compound having a photo-aligning group and one substituent selected from a hydroxy group, a carboxy group, an amino group, and an alkoxysilyl group.

Here, the photo-aligning group refers to a functional group of a structural moiety to be photodimerized or photoisomerized.

The structural moiety to be photodimerized is a moiety that forms a dimer by irradiation with light, and specific examples thereof include a cinnamoyl group, a chalcone group, a coumarin group, and an anthracene group. Among them, a cinnamoyl group having high transparency in the visible light range and photodimerization reactivity is preferred. The compound having a photo-aligning group and one substituent selected from a hydroxy group, a carboxy group, an amino group, and an alkoxysilyl group is, for example, compounds of Formulae below.

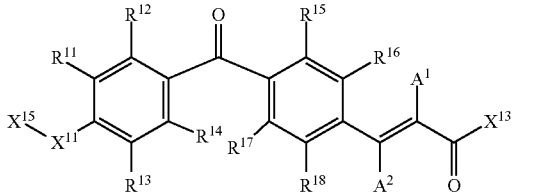
[A11]

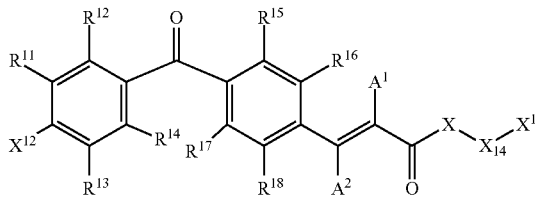
[A12]

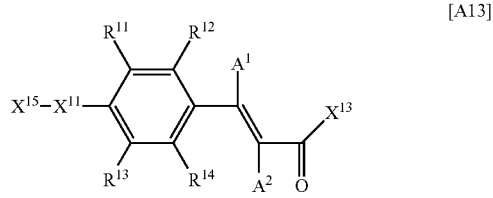
[A13]

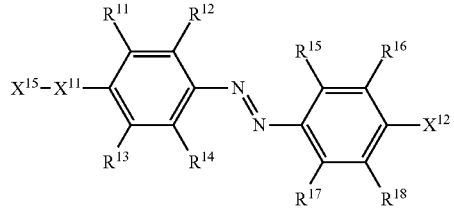
[A14]

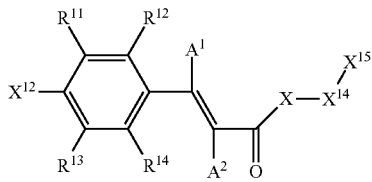
[A15]

In the Formulae, $A^1$ and $A^2$ are each independently a hydrogen atom or a methyl group, and $X^{11}$ is a group in which one to three groups selected from a $C_{1-18}$ alkylene group, a phenylene group, a biphenylene group, and a combination of them, are bonded. In this case, each of the $C_{1-18}$ alkylene group, the phenylene group, and the biphenylene group may be bonded to an adjacent group through a single bond, an ether bond, an ester bond, an amide bond, or a urea bond. $X^{12}$ is a hydrogen atom, a halogen atom, a cyano group, a $C_{1-18}$ alkyl group, a phenyl group, a biphenyl group, or a cyclohexyl group. In this case, the $C_{1-18}$ alkyl group, the phenyl group, the biphenyl group, and the cyclohexyl group may be bonded to a benzene ring through a single bond, an ether bond, an ester bond, an amide bond, or a urea bond.

$X^{13}$ is a hydroxy group, a mercapto group, a $C_{1-10}$ alkoxy group, a $C_{1-10}$ alkylthio group, a phenoxy group, a biphenyloxy group, or a phenyl group. Each of $X^{14}$ is independently a single bond, a $C_{1-20}$ alkylene group, an aromatic ring group, or an aliphatic ring group. This $C_{1-20}$ alkylene group may be branched or linear. $X^{15}$ is a hydroxy group, a carboxy group, an amino group, or an alkoxysilyl group. X is a single bond, an oxygen atom, or a sulfur atom. $X^1$ is a hydrogen atom, a $C_{1-18}$ alkyl group, a phenyl group, or a biphenyl group. In this case, each of the phenyl group and the biphenyl group may be substituted with a halogen atom or a cyano group. In cases where these substituents contain benzene rings, the benzene ring may be substituted with one or more substituents that are selected from a $C_{1-4}$ alkyl group, a $C_{1-4}$ alkoxy group, a halogen atom, a trifluoromethyl group, and a cyano group and are the same as or different from each other.

In Formulae of above, each of $R^{11}$, $R^{12}$, $R^{13}$, $R^{14}$, $R^{15}$, $R^{16}$, $R^{17}$, and $R^{18}$ is independently a hydrogen atom, a $C_{1-4}$ alkyl group, a $C_{1-4}$ alkoxy group, a halogen atom, a trifluoromethyl group, or a cyano group.

Specific examples of the compound having a photo-aligning group and a hydroxy group being the component (D) include 4-(8-hydroxyoctyloxy)cinnamic acid methyl ester, 4-(6-hydroxyhexyloxy)cinnamic acid methyl ester, 4-(4-hydroxybutyloxy)cinnamic acid methyl ester, 4-(3-hydroxypropyloxy)cinnamic acid methyl ester, 4-(2-hydroxyethyloxy)cinnamic acid methyl ester, 4-hydroxymethyloxycinnamic acid methyl ester, 4-hydroxycinnamic acid methyl ester, 4-(8-hydroxyoctyloxy)cinnamic acid ethyl ester, 4-(6-hydroxyhexyloxy)cinnamic acid ethyl ester, 4-(4-hydroxybutyloxy)cinnamic acid ethyl ester, 4-(3-hydroxypropyloxy)cinnamic acid ethyl ester, 4-(2-hydroxyethyloxy)cinnamic acid ethyl ester, 4-hydroxymethyloxycinnamic acid ethyl ester, 4-hydroxycinnamic acid ethyl ester, 4-(8-hydroxyoctyloxy)cinnamic acid phenyl ester, 4-(6-hydroxyhexyloxy)cinnamic acid phenyl ester, 4-(4-hydroxybutyloxy)cinnamic acid phenyl ester, 4-(3-hydroxypropyloxy)cinnamic acid phenyl ester, 4-(2-hydroxyethyloxy)cinnamic acid phenyl ester, 4-hydroxymethyloxycinnamic acid phenyl ester, 4-hydroxycinnamic acid phenyl ester, 4-(8-hydroxyoctyloxy)cinnamic acid biphenyl ester, 4-(6-hydroxyhexyloxy)cinnamic acid biphenyl ester, 4-(4-hydroxybutyloxy)cinnamic acid biphenyl ester, 4-(3-hydroxypropyloxy)cinnamic acid biphenyl ester, 4-(2-hydroxyethyloxy)cinnamic acid biphenyl ester, 4-hydroxymethyloxycinnamic acid biphenyl ester, 4-hydroxycinnamic acid biphenyl ester, cinnamic acid 8-hydroxyoctyl ester, cinnamic acid 6-hydroxyhexyl ester, cinnamic acid 4-hydroxybutyl ester, cinnamic acid 3-hydroxypropyl ester, cinnamic acid 2-hydroxyethyl ester, cinnamic acid hydroxymethyl ester, 4-(8-hydroxyoctyloxy)chalcone, 4-(6-hydroxyhexyloxy)chalcone, 4-(4-hydroxybutyloxy)chalcone, 4-(3-hydroxypropyloxy)chalcone, 4-(2-hydroxyethyloxy)chalcone, 4-hydroxymethyloxychalcone, 4-hydroxycalcone, 4'-(8-hydroxyoctyloxy)chalcone, 4'-(6-hydroxyhexyloxy)chalcone, 4'-(4-hydroxybutyloxy)chalcone, 4'-(3-hydroxypropyloxy)chalcone, 4'-(2-hydroxyethyloxy)chalcone, 4'-hydroxymethyloxychalcone, 4'-hydroxychalcone, 7-(8-hydroxyoctyloxy)coumarin, 7-(6-hydroxyhexyloxy)coumarin, 7-(4-hydroxybutyloxy)coumarin, 7-(3-hydroxypropyloxy)coumarin, 7-(2-hydroxyethyloxy)coumarin, 7-hydroxymethyloxycoumarin, 7-hydroxycoumarin, 6-hydroxyoctyloxycoumarin, 6-hydroxyhexyloxycoumarin, 6-(4-hydroxybutyloxy)coumarin, 6-(3-hydroxypropyloxy)coumarin, 6-(2-hydroxyethyloxy)coumarin, 6-hydroxymethyloxycoumarin, 6-hydroxycoumarin, 4-[4-(8-hydroxyoctyloxyl)benzoyl]cinnamic acid methyl ester, 4-[4-(6-hydroxyhexyloxyl)benzoyl]cinnamic acid methyl ester, 4-[4-(4-hydroxybutyloxyl)benzoyl]cinnamic acid methyl ester, 4-[4-(3-hydroxypropyloxyl)benzoyl]cinnamic acid methyl ester, 4-[4-(2-hydroxyethyloxyl)benzoyl]cinnamic acid methyl ester, 4-[4-hydroxymethyloxybenzoyl]cinnamic acid methyl ester, 4-[4-hydroxybenzoyl]cinnamic acid methyl ester, 4-[4-(8-hydroxyoctyloxyl)benzoyl]cinnamic acid ethyl ester, 4-[4-(6-hydroxyhexyloxyl)benzoyl]cinnamic acid ethyl ester, 4-[4-(4-hydroxybutyloxyl)benzoyl]cinnamic acid ethyl ester, 4-[4-(3-hydroxypropyloxyl)benzoyl]cinnamic acid ethyl ester, 4-[4-(2-hydroxyethyloxyl)benzoyl]cinnamic acid ethyl ester, 4-[4-hydroxymethyloxybenzoyl]cinnamic acid ethyl ester, 4-[4-hydroxybenzoyl]cinnamic acid ethyl ester, 4-[4-(8-hydroxyoctyloxyl)benzoyl]cinnamic acid tertiary butyl ester, 4-[4-(6-hydroxyhexyloxyl)benzoyl]cinnamic acid tertiary butyl ester, 4-[4-(4-hydroxybutyloxyl)benzoyl]cinnamic acid tertiary butyl ester, 4-[4-(3-hydroxypropyloxyl)benzoyl]cinnamic acid tertiary butyl ester, 4-[4-(2-hydroxyethyloxyl)benzoyl]cinnamic acid tertiary butyl ester, 4-[4-hydroxymethyloxybenzoyl]cinnamic acid tertiary butyl ester, 4-[4-(8-hydroxyoctyloxyl)benzoyl]cinnamic acid phenyl ester, 4-[4-(6-hydroxyhexyloxyl)benzoyl]cinnamic acid phenyl ester, 4-[4-(4-hydroxybutyloxyl)benzoyl]cinnamic acid phenyl ester, 4-[4-(3-hydroxypropyloxyl)benzoyl]cinnamic acid phenyl ester, 4-[4-(2-hydroxyethyloxyl)benzoyl]cinnamic acid phenyl ester, 4-[4-hydroxymethyloxybenzoyl]cinnamic acid phenyl ester, 4-[4-hydroxybenzoyl]cinnamic acid phenyl ester, 4-[4-(8-hydroxyoctyloxyl)benzoyl]cinnamic acid biphenyl ester, 4-[4-(6-hydroxyhexyloxyl)benzoyl]cinnamic acid biphenyl ester, 4-[4-(4-hydroxybutyloxyl)benzoyl]cinnamic acid biphenyl ester, 4-[4-(3-hydroxypropyloxyl)benzoyl]cinnamic acid biphenyl ester, 4-[4-(2-hydroxyethyloxyl)benzoyl]cinnamic acid biphenyl ester, 4-[4-hydroxymethyloxybenzoyl]cinnamic acid biphenyl ester, 4-[4-hydroxybenzoyl]cinnamic acid biphenyl ester, 4-benzoyl cinnamic acid 8-hydroxyoctyl ester, 4-benzoyl cinnamic acid 6-hydroxyhexyl ester, 4-benzoyl cinnamic acid 4-hydroxybutyl ester, 4-benzoyl cinnamic acid 3-hydroxypropyl ester, 4-benzoyl cinnamic acid 2-hydroxyethyl ester, 4-benzoyl cinnamic acid hydroxymethyl ester, 4-[4-(8-hydroxyoctyloxyl)benzoyl]chalcone, 4-[4-(6-hydroxyhexyloxyl)benzoyl]chalcone, 4-[4-(4-hydroxybutyloxyl)benzoyl]chalcone, 4-[4-(3-hydroxypropyloxyl)benzoyl]chalcone, 4-[4-(2-hydroxyethyloxyl)benzoyl]chalcone, 4-(4-hydroxymethyloxybenzoyl)chalcone, 4-(4-hydroxybenzoyl)chalcone, 4'-[4-(8-hydroxyoctyloxyl)benzoyl]chalcone, 4'-[4-(6-hydroxyhexyloxyl)benzoyl]chalcone, 4'-[4-(4-hydroxybutyloxyl)benzoyl]chalcone, 4'-[4-(3-hydroxypropyloxyl)benzoyl]chalcone, 4'-[4-(2-hydroxyethyloxyl)benzoyl]chalcone, 4'-(4-hydroxymethyloxybenzoyl)chalcone, and 4'-(4-hydroxybenzoyl)chalcone.

Specific examples of the compound having a photo-aligning group and a carboxy group being the component (D) include cinnamic acid, ferulic acid, 4-nitrocinnamic acid, 4-methoxycinnamic acid, 3,4-dimethoxycinnamic acid, coumarin-3-carboxylic acid, and 4-(N,N-dimethylamino)cinnamic acid.

Specific examples of the compound having a photo-aligning group and an amino group being the component (D) include methyl-4-aminocinnamic acid, ethyl-4-aminocinnamic acid, methyl-3-aminocinnamic acid, and ethyl-3-aminocinnamic acid.

Specific examples of the compound having a photo-aligning group and an alkoxysilyl group being the component (D) include 4-(3-trimethoxysilylpropyloxy)cinnamic acid methyl ester, 4-(3-triethoxysilylpropyloxy)cinnamic acid methyl ester, 4-(3-trimethoxysilylpropyloxy)cinnamic acid ethyl ester, 4-(3-triethoxysilylpropyloxy)cinnamic acid ethyl ester, 4-(3-trimethoxysilylhexyloxy)cinnamic acid methyl ester, 4-(3-triethoxysilylhexyloxy)cinnamic acid methyl ester, 4-(3-trimethoxysilylhexyloxy)cinnamic acid ethyl ester, and 4-(3-triethoxysilylhexyloxy)cinnamic acid ethyl ester.

Specific examples of the low molecular alignment component being the component (D) may be the specific examples of above, but not limited to these.

When the low molecular alignment component being the component (D) is the compound having a photo-aligning group and a hydroxy group, a compound having in the molecule two or more photo-aligning groups and/or two or more hydroxy groups can be used as the component (D). Specifically, as the component (D), a compound having in the molecule one hydroxy group and two or more photo-aligning groups, a compound having in the molecule one photo-aligning group and two or more hydroxy groups, or a compound having in the molecule two or more photo-aligning groups and two or more hydroxy groups can be used. Examples of the compound having in the molecule two or more photo-aligning groups and two or more hydroxy groups include a compound of Formula below:

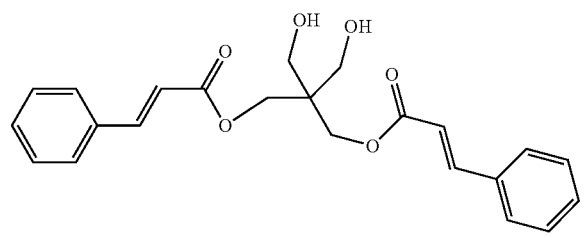 [SMILES: O=C(/C=C/c1ccccc1)OCC(CO)(CO)COC(=O)/C=C/c1ccccc1]

Appropriately selecting such a compound enables control of the molecular weight of the low molecular alignment component being the component (D) to a value within a desired range. Accordingly, it is possible to prevent the low molecular alignment component being the component (D) from sublimating when the low molecular alignment component being the component (D) is heated to form a cured film of the present embodiment, as will be described later. Thus, the cured-film formation composition of the present embodiment can provide, as a cured film, an orientation material allowing an alignment process performed by low light exposure.

In the cured-film formation composition of the present embodiment, the compound being the component (D) may be a mixture of multiple types of the compounds each having a photo-aligning group and one substituent selected from a hydroxy group, a carboxy group, an amino group, and an alkoxysilyl group.

The component (D) in the cured-film formation composition of the present embodiment of the present invention is preferably contained in an amount of 0.1 part by mass to 40 parts by mass, and more preferably 1 part by mass to 30 parts by mass, based on 100 parts by mass of the component (A). When this proportion is excessively low, the effect of decreasing the standard amount of light exposure is not satisfactory observed in a cured film obtained from the cured-film formation composition of the present embodiment, while when this proportion is excessively high, the characteristic that the direction for regulating liquid crystal alignment varies depending on the amount of light exposure may be lost.

[Component (E)]

The cured-film formation composition of the present embodiment of the present invention may contain other components unless the effects of the present invention are impaired, and for example, another polymer component may be contained as the component (E). That is, even if the cured-film formation composition of the present embodiment contains another polymer component as the component (E), a cured film obtained therefrom can show the characteristic that the direction for regulating liquid crystal alignment varies depending on the amount of light exposure.

Examples of the other polymer component being the component (E) include a polymer having a linear structure or a branched structure such as an acrylic polymer, a polyamic acid, a polyimide, polyvinyl alcohol, a polyester, a polyester polycarboxylic acid, a polyether polyol, a polyester polyol, a polycarbonate polyol, a polycaprolactone polyol, a polyalkylene imine, a polyallylamine, celluloses (cellulose or derivatives thereof), a phenol novolac resin, and a melamine formaldehyde resin, and a cyclic polymer such as cyclodextrins.

Among them, as the acrylic polymer, a polymer obtained by polymerizing a monomer having an unsaturated double bond, such as an acrylic acid ester, a methacrylic acid ester, and styrene can be used.

Examples of the other polymer component being the component (E) preferably include hydroxyalkyl cyclodextrins, celluloses, an acrylic polymer having at least one of a polyethylene glycol ester group and a $C_{2-5}$ hydroxyalkyl ester group and at least one of a carboxy group and a phenolic hydroxy group, an acrylic polymer having an aminoalkyl group in a side chain, a polyether polyol, a polyester polyol, a polycarbonate polyol, a polycaprolactone polyol, a melamine formaldehyde resin, and a phenol novolac resin.

The acrylic polymer that is one preferred example of the other polymer component of the component (E) and that has at least one of a polyethylene glycol ester group and a $C_{2-5}$ hydroxyalkyl ester group and at least one of a carboxy group and a phenolic hydroxy group may be any acrylic polymer having such a structure. The skeleton of the main chain and the type of the side chain of a polymer constituting the acrylic polymer, for example, are not limited to particular ones.

The structure unit having at least one of a polyethylene glycol ester group and a $C_{2-5}$ hydroxyalkyl ester group is preferably a structure unit of Formula [B1] below.

The structure unit having at least one of a carboxy group and a phenolic hydroxy group is preferably a structure unit of Formula [B2] below.

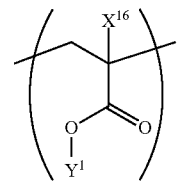

[B1]

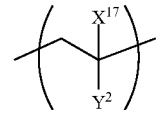

[B2]

In Formulae [B1] and [B2], $X^{16}$ and $X^{17}$ are each independently a hydrogen atom or a methyl group; $Y^1$ is an $H-(OCH_2CH_2)_n-$ group (herein, the value of n is 2 to 50, and preferably 2 to 10) or a $C_{2-5}$ hydroxyalkyl group; and $Y^2$ is a carboxy group or a phenolic hydroxy group.

The acrylic polymer being an example of the component (E) has a weight-average molecular weight of preferably 3,000 to 200,000, more preferably 4,000 to 150,000, and still more preferably 5,000 to 100,000. An excessively high weight-average molecular weight exceeding 200,000 may reduce the solubility in solvent, so that the handling property may deteriorate, whereas an excessively low weight-average molecular weight below 3,000 may cause insufficient curing during heat curing, so that the solvent resistance and the heat resistance may decrease. The weight-average molecular weight herein is a value obtained by gel permeation chromatography (GPC) using polystyrene as the standard sample. The same method is used hereinafter in the present specification.

A simple method for synthesizing the acrylic polymer being an example of the component (E) is a method for copolymerizing a monomer (hereinafter, also called a "b1 monomer") having at least one of a polyethylene glycol ester group and a $C_{2-5}$ hydroxyalkyl ester group with a monomer (hereinafter, called a "b2 monomer") having at least one of a carboxy group and a phenolic hydroxy group.

Examples of the monomer having a polyethylene glycol ester group include mono acrylate or mono methacrylate of $H-(OCH_2CH_2)_n-OH$. The value of n is 2 to 50 and preferably 2 to 10.

Examples of the monomer having a $C_{2-5}$ hydroxyalkyl ester group include 2-hydroxyethyl methacrylate, 2-hydroxyethyl acrylate, 2-hydroxypropyl methacrylate, 2-hydroxypropyl acrylate, 4-hydroxybutyl acrylate, and 4-hydroxybutyl methacrylate.

Examples of the monomer having a carboxy group include acrylic acid, methacrylic acid, and vinylbenzoic acid.

Examples of the monomer having a phenolic hydroxy group include p-hydroxystyrene, m-hydroxystyrene, and o-hydroxystyrene.

In the present embodiment, when the acrylic polymer being an example of the component (E) is synthesized, unless the effects of the present invention are impaired, another monomer, specifically a monomer having neither a hydroxy group nor a carboxy group can be used other than the b1 monomer or the b2 monomer.

Examples of this monomer include an acrylic acid ester compound such as methylacrylate, ethylacrylate, propyl acrylate, isopropyl acrylate, butyl acrylate, isobutyl acrylate, and t-butyl acrylate; a methacrylic acid ester compound such as methyl methacrylate, ethyl methacrylate, propyl methacrylate, isopropyl methacrylate, butyl methacrylate, isobutyl methacrylate, and t-butyl methacrylate; a maleimide compound such as maleimide, N-methyl maleimide, N-phenylmaleimide, and N-cyclohexyl maleimide; an acrylamide compound; acrylonitrile; maleic acid anhydride; a styrene compound; and a vinyl compound.

The b1 monomer and the b2 monomer used for obtaining the acrylic polymer being an example of the component (E) are preferably used in an amount of 2% by mole to 95% by mole and 5% by mole to 98% by mole, respectively, based on the total amount of all monomers used for obtaining the acrylic polymer being an example of the component (E).

When a monomer having only a carboxy group is used as the b2 monomer, it is preferable that the b1 monomer be used in an amount of 60% by mole to 95% by mole and the b2 monomer be used in an amount of 5% by mole to 40% by mole, based on the total amount of all monomers used for obtaining the acrylic polymer being an example of the component (E).

When a monomer having only a phenolic hydroxy group is used as the b2 monomer, it is preferable that the b1 monomer be used in an amount of 2% by mole to 80% by mole and the b2 monomer be used in an amount of 20% by mole to 98% by mole, based on the total amount of all monomers used for obtaining the acrylic polymer being an example of the component (E). When the amount of the b2 monomer is excessively low, the effects of the addition are not obtained, and when the amount of the b2 monomer is excessively high, the compatibility with the component (A) is prone to decrease.

Although the method for obtaining the acrylic polymer being an example of the component (E) is not limited to a particular method, the acrylic polymer can be obtained, for example, by subjecting the b1 monomer, the b2 monomer, a monomer other than the b1 monomer and the b2 monomer if desired, and a polymerization initiator or the like to polymerization reaction in a solvent in which they coexist at a temperature of 50° C. to 110° C. The solvent used herein is not limited as long as the solvent can dissolve the b1 monomer, the b2 monomer, the monomer other than the b1 monomer and the b2 monomer used if desired, and the polymerization initiator or the like. Specific examples thereof will be recited in [Solvent] described later.

Examples of the acrylic polymer having an aminoalkyl group in a side chain, which is one preferred example of the other polymer component of the component (E), include polymers obtained by polymerizing aminoalkyl ester monomers such as aminoethyl acrylate, aminoethyl methacrylate, aminopropyl acrylate, and aminopropyl methacrylate, and polymers obtained by copolymerizing any of the aminoalkyl ester monomers with one or more monomers selected from the above acrylic monomers.

The acrylic polymer being an example of the component (E) obtained by the above-described method is generally in a state of solution and is dissolved in the solvent.

The solution of the acrylic polymer being an example of the component (E) obtained by the method is poured into diethyl ether, water, or the like with stirring and the acrylic polymer is reprecipitated. The precipitate thus obtained is filtered and washed, and then is dried at room temperature or dried by heating under atmospheric pressure or reduced pressure. Thus, a powder of the acrylic polymer being an example of the component (E) can be prepared. By this operation, the polymerization initiator and an unreacted monomer that coexist with the acrylic polymer being an example of the component (E) can be removed, and consequently a powder of the purified acrylic polymer as the component (E) can be obtained. If the acrylic polymer cannot be sufficiently purified by one operation, the obtained powder may be redissolved in a solvent, followed by repeating the above-described operation.

Examples of the polyether polyol being one preferred example of the other polymer component of the component (E) include polyethylene glycol, polypropylene glycol, and propylene glycol, and also include those obtained by adding propylene oxide, polyethylene glycol, polypropylene glycol, or the like, to polyhydric alcohol such as bisphenol A, triethylene glycol, and sorbitol. Specific examples of the polyether polyol include ADEKA polyether P-series, G-series, EDP-series, BPX-series, FC-series, and CM-series manufactured by ADEKA Corporation; and UNIOX (registered trademark) HC-40, HC-60, ST-30E, ST-40E, G-450, and G-750, UNIOL (registered trademark) TG-330, TG-1000, TG-3000, TG-4000, HS-1600D, DA-400, DA-700, and DB-400, and NONION (registered trademark) LT-221, ST-221, and OT-221 manufactured by NOF Corporation.

Examples of the polyester polyol being one preferred example of the other polymer component of the component (E) include those obtained by causing a polyhydric carboxylic acid such as adipic acid, sebacic acid, and isophthalic acid to react with a diol such as ethylene glycol, propylene glycol, butylene glycol, polyethylene glycol, and polypropylene glycol. Specific examples of the polyester polyol include POLYLITE (registered trademark) OD-X-286, OD-X-102, OD-X-355, OD-X-2330, OD-X-240, OD-X-668, OD-X-2108, OD-X-2376, OD-X-2044, OD-X-688, OD-X-2068, OD-X-2547, OD-X-2420, OD-X-2523, OD-X-2555, and OD-X-2560 manufactured by DIC Corporation; and Polyol P-510, P-1010, P-2010, P-3010, P-4010, P-5010, P-6010, F-510, F-1010, F-2010, F-3010, P-1011, P-2011, P-2013, P-2030, N-2010, and PNNA-2016 manufactured by Kuraray Co., Ltd.

Examples of the polycaprolactone polyol being one preferred example of the other polymer component of the component (E) include those obtained by subjecting ε-caprolactone to ring-opening polymerization with a polyhydric alcohol such as trimethylolpropane and ethylene glycol as an initiator. Specific examples of the polycaprolactone polyol include POLYLITE (registered trademark) OD-X-2155, OD-X-640, and OD-X-2568 manufactured by DIC Corporation, and PLACCEL (registered trademark) 205, L205AL, 205U, 208, 210, 212, L212AL, 220, 230, 240, 303, 305, 308, 312, and 320 manufactured by Daicel Chemical Industries, Ltd.

Examples of the polycarbonate polyol being one preferred example of the other polymer component of the component (E) include those obtained by causing a polyhydric alcohol such as trimethylolpropane and ethylene glycol to react with diethylcarbonate, diphenylcarbonate, ethylene carbonate, or the like. Specific examples of the polycarbonate polyol include PLACCEL (registered trademark) CD205, CD205PL, CD210, and CD220 manufactured by Daicel Chemical Industries, Ltd., and polycarbonate diol C-590, C-1050, C-2050, C-2090, and C-3090 manufactured by Kuraray Co., Ltd.

Example of the celluloses being one preferred example of the other polymer component of the component (E) include hydroxyalkyl celluloses such as hydroxyethyl cellulose and hydroxypropyl cellulose; and hydroxyalkyl alkyl celluloses such as hydroxyethyl methyl cellulose, hydroxypropyl methyl cellulose, and hydroxyethyl ethyl cellulose. For example, the hydroxyalkyl celluloses such as hydroxyethyl cellulose and hydroxypropyl cellulose are preferred.

Examples of the cyclodextrins being one preferred example of the other polymer component of the component (E) include cyclodextrins such as α-cyclodextrin, β-cyclodextrin, and γ-cyclodextrin, methylated cyclodextrins such as methyl-α-cyclodextrin, methyl-β-cyclodextrin, and methyl-γ-cyclodextrin, and hydroxyalkyl cyclodextrins such as hydroxymethyl-α-cyclodextrin, hydroxymethyl-β-cyclodextrin, hydroxymethyl-γ-cyclodextrin, 2-hydroxyethyl-α-cyclodextrin, 2-hydroxyethyl-β-cyclodextrin, 2-hydroxyethyl-γ-cyclodextrin, 2-hydroxypropyl-α-cyclodextrin, 2-hydroxypropyl-β-cyclodextrin, 2-hydroxypropyl-γ-cyclodextrin, 3-hydroxypropyl-α-cyclodextrin, 3-hydroxypropyl-β-cyclodextrin, 3-hydroxypropyl-γ-cyclodextrin, 2,3-dihydroxypropyl-α-cyclodextrin, 2,3-dihydroxypropyl-β-cyclodextrin, and 2,3-dihydroxypropyl-γ-cyclodextrin.

Examples of the melamine formaldehyde resin being one preferred example of the other polymer component of the component (E) include a resin of Formula below obtained by polycondensation of melamine and formaldehyde.

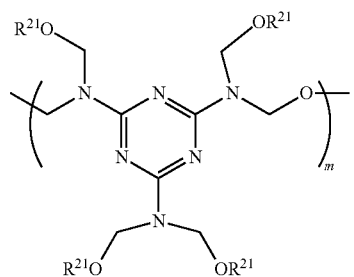

In the Formula, $R^{21}$ is a hydrogen atom or a $C_{1-4}$ alkyl group, and m is a natural number that represents the number of repeating units.

In the melamine formaldehyde resin of the component (E), the methylol group produced during the polycondensation of melamine and formaldehyde is preferably alkylated in terms of preservation stability.

Although the method for obtaining the melamine formaldehyde resin of the component (E) is not limited to a particular method, the resin is generally synthesized by mixing melamine and formaldehyde, making the resultant mixture weak alkaline using sodium carbonate, ammonia, or the like, and then heating the resultant mixture at 60° C. to 100° C. The methylol group may be alkoxylated by further reaction with an alcohol.

The melamine formaldehyde resin of the component (E) has a weight-average molecular weight of preferably 250 to 5,000, more preferably 300 to 4,000, and still more preferably 350 to 3,500. An excessively high weight-average molecular weight exceeding 5,000 may reduce the solubility in solvent, so that the handling property may deteriorate, whereas an excessively low weight-average molecular weight below 250 may cause insufficient curing during heat curing, so that the solvent resistance and the heat resistance enhancing effects may not sufficiently obtained.

In the embodiment of the present invention, the melamine formaldehyde resin of the component (E) may be used in a form of liquid or in a form of solution in which the purified liquid is redissolved in a solvent described later.

Furthermore, in the embodiment of the present invention, the melamine formaldehyde resin of the component (E) may be a mixture of multiple types of the melamine formaldehyde resin of the component (E).

Examples of the phenol novolac resin being one preferred example of the other polymer component of the component (E) include a phenol-formaldehyde polycondensate.

In the cured-film formation composition of the present embodiment, the other polymer component of the component (E) may be used in a form of powder or in a form of solution in which the purified powder is redissolved in a solvent described later.

Furthermore, in the cured-film formation composition of the present embodiment, the other polymer component of the component (E) may be a mixture of multiple types of the polymers that are the examples of the component (E).

The amount of the component (E) to be added is preferably 5 parts by mass to 100 parts by mass and more preferably 10 parts by mass to 80 parts by mass based on 100 parts by mass of the total amount of the component (A) and the component (B).

[Component (F)]

The cured-film formation composition of the present embodiment of the present invention may contain other components unless the effects of the present invention are impaired, and for example, a sensitizer may be contained as the component (F). After a cured film of the embodiment of the present invention is formed from the cured-film formation composition of the embodiment of the present invention, the component (F) is effective for promoting a photodimerization reaction on the cured film.

Examples of the sensitizer being the component (F) include derivatives of benzophenone, anthracene, anthraquinone, and thioxanthone; and a nitrophenyl compound. Among them, a benzophenone derivative: N,N-diethylaminobenzophenone; and nitrophenyl compounds: 2-nitrofluorene; 2-nitrofluorenone; 5-nitroacenaphthene; 4-nitrobiphenyl; 4-nitrocinnamic acid; 4-nitrostilbene; 4-nitrobenzophenone; and 5-nitroindole are particularly preferred.

These sensitizers are not particularly limited to those described above. These may be used singly or in combination of two or more compounds.

In the embodiment of the present invention, the sensitizer being the component (F) is preferably in a proportion of 0.1 part by mass to 20 parts by mass, and more preferably 0.2 part by mass to 10 parts by mass with respect to 100 parts by mass of the component (A). When this proportion is excessively low, the effect as a sensitizer may not be sufficiently obtained, and when the proportion is excessively high, decrease of the transmittance and roughening of the coating film may occur in the formed cured film.

[Solvent]

The cured-film formation composition of the present embodiment of the present invention is mainly used in a solution state in which the composition is dissolved in a solvent. In such a case, the solvent used can dissolve the component (A) and the component (B), and if necessary, the component (C), the component (D), the component (E), and the component (F), and/or other additives described below, and the type, the structure, and the like of the solvent are not particularly limited as long as the solvent shows such an ability for dissolution.

Specific examples of the solvent include ethylene glycol monomethyl ether, ethylene glycol monoethyl ether, methylcellosolve acetate, ethylcellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, propylene glycol propyl ether, toluene, xylene, methyl ethyl ketone, cyclopentanone, cyclohexanone, 2-butanone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, N,N-dimethylformamide, N,N-dimethylacetamide, and N-methylpyrrolidone.

These solvents may be used singly or in combination of two or more thereof. Among these solvents, propylene glycol monomethyl ether, propylene glycol monomethyl ether acetate, cyclohexanone, 2-heptanone, propylene glycol propyl ether, propylene glycol propyl ether acetate, ethyl lactate, butyl lactate, methyl 3-methoxypropionate, ethyl 3-methoxypropionate, ethyl 3-ethoxypropionate, and methyl 3-ethoxypropionate are more preferable because of good film formability and high safety.

[Other Additive]

The cured-film formation composition of the present embodiment of the present invention can contain, as long as not impairing the effects of the present invention and if necessary, a silane coupling agent, a surfactant, a rheology adjusting agent, a pigment, a dye, a preservation stabilizer, an antifoaming agent, and an antioxidant, for example.

[Preparation of Cured-Film Formation Composition]

The cured-film formation composition of the present embodiment of the present invention contains an acrylic copolymer having a photodimerizable moiety and a thermally cross-linkable moiety of the component (A) and a cross-linking agent of the component (B). If desired, the cured-film formation composition may contain a cross-linking catalyst of the component (C), a low molecular alignment component of the component (D), another polymer component of the component (E), a sensitizer of the component (F), and one or more types of other additives. These are generally in a state of being dissolved in the solvent for use.

Among them, preferred examples of the cured-film formation composition of the present embodiment are listed below.

[1]: A cured-film formation composition that contains the component (B) in a content of 10 parts by mass to 150 parts by mass based on 100 parts by mass of the component (A).

[2]: A cured-film formation composition that contains the component (B) in an amount of 10 parts by mass to 150 parts by mass based on 100 parts by mass of the component (A), and a solvent.

[3]: A cured-film formation composition that contains the component (B) in an amount of 10 parts by mass to 150 parts by mass and the component (C) in an amount of 0.01 part by mass to 10 parts by mass based on 100 parts by mass of the component (A), and a solvent.

[4]: A cured-film formation composition that contains the component (B) in an amount of 10 parts by mass to 150 parts by mass, the component (C) in a n amount of 0.01 part by mass to 10 parts by mass, and the component (D) in a n amount of 0.1 part by mass to 40 parts by mass based on 100 parts by mass of the component (A), and a solvent.

The blending proportion, a preparation method, and the like when the cured-film formation composition of the embodiment of the present invention is used as a solution will be described below in detail.

The proportion of a solid content in the cured-film formation composition of the present embodiment is, but not limited to as long as each component is uniformly dissolved in a solvent, 1% by mass to 80% by mass, preferably 3% by mass to 60% by mass, and more preferably 5% by mass to 40% by mass. The solid content herein indicates components remaining after excluding the solvent from all of the components in the cured-film formation composition.

The preparation method of the cured-film formation composition of the embodiment of the present invention is not limited to a particular method. Examples of the preparation method include a method in which the component (A) is dissolved in a solvent, the component (B) and further the component (C) and the component (D) are mixed in the resultant, at predetermined proportions, to make the resultant solution uniform, and a method in which in a certain step of this preparation method, other components are further added therein if necessary, and the resultant solution is mixed.

In the preparation of the cured-film formation composition of the embodiment of the present invention, a solution of the specific copolymer obtained by polymerization reaction in the solvent can be used without being processed. In this case, to the solution of the specific copolymer that is a solution of the component (A), the component (B), the component (C), the component (D), and the like are added in the same manner described above, and the resultant solution is made uniform. At this time, a solvent may be further added thereto for the purpose of adjusting the concentration. In this case, the solvent used in the process of preparing the specific copolymer may be the same as or different from the solvent used for adjusting the concentration in the preparation of the cured-film formation composition.

It is preferable that the solution of the cured-film formation composition thus prepared be used after being filtered with, for example, a filter having a pore diameter of about 0.2 μm.

The cured-film formation composition of the present embodiment thus prepared forms a cured film of the present embodiment. The cured film of the present embodiment shows controllability for liquid crystal alignment, which is a property of regulating liquid crystal alignment depending on the amount of exposure to polarized light, and also shows a characteristic that the direction for regulating liquid crystal alignment varies depending on the amount of light exposure.

More specifically, in the cured film of the present embodiment, there is a standard amount of light, which is a value having a certain range, to change the direction for regulating liquid crystal alignment, and the cured film has a characteristic that the direction for regulating liquid crystal alignment varies depending on whether an amount of exposure to polarized light is more or less than the standard amount of light. In this case, as will be described later, the cured film of the present embodiment obtained from the cured-film formation composition of the present embodiment has a characteristic that the direction for regulating liquid crystal alignment varies by an angular difference of approximately 90 degrees depending on whether an amount of exposure to polarized light is more or less than the standard amount of light.

That is, each of the cured films of the present embodiment has a threshold with a certain range, and the direction for regulating liquid crystal alignment can be selected by selecting an amount of exposure to polarized light more than the threshold or an amount of exposure to polarized light less than the threshold and performing exposure, and an angular difference between selectable two directions can be approximately 90 degrees.

Accordingly, in the method for manufacturing an orientation material of the embodiment of the present invention, the above-described superior characteristics of the cured film of the present embodiment obtained from the cured-film formation composition of the present embodiment are utilized. In a step of exposing to polarized light, a photo-alignment process in which exposure to polarized light is performed one time with one type of polarized light, instead of a conventional two-stage exposure step in which irradiation is performed twice with two types of polarized light whose polarization directions are different from each other. This step allows highly efficient manufacturing of an orientation material having a first orientation region and a second orientation region, in which directions for regulating liquid crystal alignment are different from each other, and thus a patterned retardation material is highly efficiently manufactured. Hereinafter, the method for manufacturing an orientation material of the embodiment of the present invention, and the method for manufacturing a retardation material by using the orientation material will be explained.

<Method for Manufacturing Orientation Material and Retardation Material>

In the method for manufacturing an orientation material of the embodiment of the present invention, a cured film is formed by using the above-described cured-film formation composition of the present embodiment. The cured film of the present embodiment is then subjected to a photo-alignment process in which the cured film of the embodiment is exposed to polarized light, so that an orientation material for liquid crystal is manufactured. In the orientation material, first orientation regions and second orientation regions, in which directions for regulating liquid crystal alignment are different from each other, are regularly aligned. After that, a patterned retardation material suitably used for a 3D display, in which a plurality of retardation regions having different retardation characteristics is arranged, is manufactured by using the orientation material of the present embodiment.

In the method for manufacturing the orientation material of the present embodiment preferably includes at least the steps [1] to [3] below in the following order so that the orientation material having the first orientation regions and the second orientation regions regularly aligned is formed on a substrate.

[1] A step of forming a coating film, in which the cured-film formation composition of the present embodiment is applied onto a substrate to form a coating film (hereinafter, also called [1] Step of Forming Coating Film).

[2] A step of heating, in which the coating film obtained in [1] Step of Forming Coating Film is heated to form a cured film on the substrate (hereinafter, also called [2] Step of Heating).

[3] A step of exposing to polarized light, in which the first regions for forming the first orientation regions and the second regions for forming the second orientation regions of the cured film obtained in [2] Step of Heating are irradiated at the same time with polarized light that has an identical polarization direction such that amounts of light exposure are different between the first regions and the second regions (hereinafter, also called [3] Step of Exposing to Polarized Light).

Through the steps [1] to [3], the orientation material having the first orientation regions and the second orientation regions regularly aligned can be highly efficiently manufactured. Hereinafter, the steps [1] to [3] will be explained in more detail.

[[1] Step of Forming Coating Film]

In this step, the solution of the cured-film formation composition of the present embodiment is applied onto a substrate to form a coating film. As described above, the cured-film formation composition of the present embodiment contains an acrylic copolymer having a photodimerizable moiety and a thermally cross-linkable moiety of the component (A) and a cross-linking agent of the component (B).

As the substrate, a silicon/silicon dioxide coated substrate, a silicon nitride substrate, for example, a substrate coated with a metal such as aluminum, molybdenum, and chromium, a glass substrate, a quartz substrate, an ITO substrate, and the like can be used. For example, films, such as a resin film including a triacetylcellulose (TAC) film, a cycloolefin polymer film, a poly ethylene terephthalate film, and an acrylic film can also be used.

As a method for coating the cured-film formation composition, a method such as bar coating, spin coating, flow coating, roll coating, slit coating, slit coating followed by spin coating, inkjet coating, printing, and the like can be used.

After the coating film is formed on the substrate in this step, a step for prebaking can be provided mainly for removing a solvent before the next [2] Step of Heating. The prebaking can be performed by using a hot plate or an oven. Although the condition of prebaking varies depending on contained components of the cured-film formation composition and the type of the solvent, it is preferably at a temperature from 50° C. to 100° C. and for 1 minute to 10 minutes.

[[2] Step of Heating]

In this step, the coating film on the substrate obtained in [1] Step of Forming Coating Film is heated and dried so that a cross-linking reaction proceeds by a cross-linking agent being the component (B) contained in the cured-film formation composition, and a cured film is formed.

The coating film can be heated and dried by using a hot plate or an oven. A condition for the heating is selected so that the cross-linking reaction caused by the cross-linking agent proceeds in such a manner that a component of the cured film that will become an orientation material is not eluted into a polymerizable liquid crystal solution applied onto the orientation material. For example, a heating temperature and a heating time are used that are appropriately selected from a temperature range of 60° C. to 200° C. and a time range of 0.4 minute to 60 minutes. The heating temperature and the heating time are preferably 70° C. to 160° C. and 0.5 minute to 10 minutes.

The film thickness of the cured film formed in this step is 0.05 μm to 5 μm, for example.

[[3] Step of Exposing to Polarized Light]

In this step, the cured film formed in [2] Step of Heating is subjected to a photo-alignment process, in which the cured film is irradiated with polarized ultraviolet light for exposure to polarized light.

As a method for irradiation with polarized ultraviolet light, ultraviolet light to visible light having a wavelength of 150 nm to 450 nm are generally used, and the irradiation is performed by irradiating a cured film on a substrate with linearly polarized light in a vertical direction or an oblique direction at room temperature or in a heated state.

In the method for manufacturing an orientation material of the present embodiment, an orientation material for liquid crystal is manufactured. In the orientation material, first orientation regions and second orientation regions, in which directions for regulating liquid crystal alignment are different from each other, are regularly aligned. In this case, the cured film of the present embodiment has a characteristic that the direction for regulating the liquid crystal alignment of the orientation material to be formed varies depending on the amount of exposure to polarized light. In the cured film of the present embodiment, there is a standard amount of exposure to polarized light used to determine the direction for regulating liquid crystal alignment, and the cured film has a characteristic that the direction for regulating liquid crystal alignment varies depending on whether an amount of exposure to polarized light is more or less than the standard amount of light. Although the standard amount of light varies depending on components constituting the cured-film formation composition, it is within a range from 5 to 100 mJ. In terms of productivity and a production margin, the standard amount of light is preferably within the range from 5 to 100 mJ.

That is, each of the cured films of the present embodiment has a threshold with a certain range, and the direction for regulating liquid crystal alignment can be selected, in the orientation material to be formed, by selecting an amount of exposure to polarized light more than the threshold or an amount of exposure to polarized light less than the threshold and performing r exposure.

Accordingly, the first regions of the cured film for forming the first orientation regions of the orientation material and the second regions of the cured film for forming the second orientation regions of the orientation material are irradiated at the same time with polarized light that has an identical polarization directions such that amounts of light exposure are different between the first regions and the second regions. More specifically, either the first regions or the second regions of the cured film is exposed to polarized light using an amount of light exposure more than the above-described threshold, and the other region is exposed to polarized light using an amount of light exposure less than the threshold. As a result, in the manufactured orientation material, directions for regulating liquid crystal alignment are different between the first orientation regions and the second orientation regions that are regularly aligned.

As a method for exposing the first regions and the second regions of the cured film, which are regularly aligned, to polarized light of different amounts of light exposure as described above, a method in which a gray tone mask is used, and exposure is performed only one time using one type of polarized light is preferred.

The gray tone mask is a photomask that enables intermediate exposure, in which a semi-transmissive region (the transmittance is about 10% to 70%) is provided to partially regulate an amount of light exposure. For example, in addition to the gray tone mask in which a slit equal to or less than the resolution of an exposure machine is provided in a semi-transmissive region in order to block light partially for intermediate exposure, what is called a half-tone mask in which a semi-transmissive film is provided in a semi-transmissive region for intermediate exposure may also be used.

In this step, a gray tone mask is preferably used which is patterned according to the alignment of the first regions and the seconds regions of the cured film, and in which transmissive regions and semi-transmissive regions are aligned, such that an amount of light exposure for the first regions are different from that for the second regions.

For example, in cases where the retardation material to be manufactured is a patterned retardation material in which two types of retardation regions whose retardation characteristics are different from each other are alternately aligned in stripes, an orientation material for manufacturing the retardation material is also patterned such that the first orientation regions and the second orientation regions are alternately aligned in stripes. Accordingly, also in the cured film before being subjected to an alignment process, the first regions for forming the first orientation regions and the second regions for forming the second orientation regions are alternately aligned in stripes. Thus, in the gray tone mask to be used, the transmissive regions and semi-transmissive regions are preferably alternately aligned in stripes according to the alignment of the first regions and the second regions.

FIG. 1 is a figure schematically illustrating the method for manufacturing an orientation material of the embodiment of the present invention.

As shown in FIG. 1, in the method for manufacturing an orientation material of the present embodiment, a cured film 2 formed on a substrate 1 through [1] Step of Forming Coating Film and [2] Step of Heating is exposed to polarized light with a gray tone mask 3 in [3] Step of Exposing to Polarized Light. First regions of the cured film 2 for forming first retardation regions and second regions of the cured film 2 for forming second retardation regions, which are two types of retardation regions in a retardation material to be manufactured later, are irradiated with polarized light 4 having a specific polarization direction such that an amount of light exposure for the first regions are different from that for the second regions.

By performing irradiation with polarized light using the gray tone mask and one-time exposure to polarized light, either the first regions or the second regions of the cured film are irradiated with polarized light to be exposed using an amount of light exposure more than the above-described threshold, and the other regions are irradiated with polarized light to be exposed using an amount of light exposure less than the threshold.

The exposure to polarized light is performed through the gray tone mask, and irradiation with polarized ultraviolet light is performed, for example, in the direction of 45 degrees from a predetermined standard.

In this step, an orientation material can be obtained in which two types of liquid crystal alignment regions, the first orientation regions and the second orientation regions, are formed by exposing the cured film to polarized light, and the directions for regulating liquid crystal alignment are different between the first orientation regions and the second orientation regions by 90 degrees.

The method for manufacturing an orientation material of the present embodiment has the steps [1] to [3] described above, and allows highly efficient manufacturing of the orientation material having the first orientation regions and the second orientation regions regularly aligned by one-time exposure to polarized light using polarized ultraviolet light having one type of polarization direction.

The method for manufacturing a retardation material of the present embodiment can be performed by using the orientation material manufactured in the method for manufacturing an orientation material of the present embodiment. That is, a step for forming a retardation material in which a retardation substance comprising a polymerizable liquid crystal is applied and cured is provided after the steps [1] to [3] of the method for manufacturing an orientation material of the present embodiment, and thus the method for manufacturing a retardation material of the present embodiment can be performed highly efficiently by using the orientation material of the present embodiment.

In the step for forming a retardation material of the method for manufacturing a retardation material of the present embodiment, a retardation substance including a polymerizable liquid crystal solution is applied, and then, the retardation substance is heated up to the phase transition temperature of the liquid crystal. Thus, the retardation substance is transformed into a liquid crystal state to be aligned on the orientation material. The retardation substance thus aligned is cured without being processed. Accordingly, a patterned retardation material can be obtained as a retardation material in which two types of retardation regions having different retardation characteristics are regularly aligned according to the alignment of the first orientation regions and the second orientation regions of the orientation material of the present embodiment.

The retardation material of the present embodiment thus manufactured can be suitably used as a patterned retardation material used for a 3D display.

EXAMPLES

The embodiment of the present invention will be described in further detail with reference to examples below, but the embodiment of the present invention is not limited to the examples.

[ABBREVIATIONS USED IN EXAMPLES]

The following are the meanings of the abbreviations used in Examples below.
<Raw Material of Acrylic Polymer>
HEMA: 2-hydroxyethyl methacrylate
CIN1: 4-(6-methacryloxyhexyl-1-oxy)cinnamic acid methyl ester
CIN2: 4-(methacryloylethylaminocarbonyloxyhexyloxy) cinnamic acid methyl ester
AIBN: α,α'-azobisisobutyronitrile
CIN3: 4-hydroxyhexyloxy cinnamic acid methyl ester
MMA: methyl methacrylate
MAA: methacrylic acid <Cross-Linking Agent>
HMM: hexamethoxymethylmelamine
<Cross-linking Catalyst>
PPTS: pyridinium p-toluenesulfonic acid
<Solvent>
PM: propylene glycol monomethyl ether
PMA: propylene glycol monomethyl ether acetate The number-average molecular weight and the weight-average molecular weight of the polymer obtained according to Synthesis Examples below were measured with a GPC apparatus manufactured by JASCO Corporation (Shodex (registered trademark) column KF 803L and KF 804L) under the condition of performing elution by flowing an elution solvent tetrahydrofuran in the column (column temperature: 40° C.) at a flow rate of 1 mL/min. The number-average molecular weight (hereinafter, called Mn) and the weight-average molecular weight (hereinafter, called Mw) were expressed as values in terms of polystyrene.

Synthesis Example 1

40.0 g of CIN1, 10.0 g of HEMA, and 1.2 g of AIBN as a polymerization catalyst were dissolved in 133.5 g of PMA, and the resultant solution was reacted at 85° C. for 20 hours to obtain a specific copolymer solution (solid content concentration: 27% by mass) (P1). Mn and Mw of the obtained specific copolymer were 7,080 and 14,030, respectively.

Synthesis Example 2

40.0 g of CIN2, 10.0 g of HEMA, and 1.2 g of AIBN as a polymerization catalyst were dissolved in 204.8 g of PM, and the resultant solution was reacted at 85° C. for 20 hours to obtain a specific copolymer solution (solid content concentration: 20% by mass) (P2). Mn and Mw of the obtained specific copolymer were 6,500 and 12,000, respectively.

Synthesis Example 3

2.5 g of MAA, 9.2 g of MMA, 5.0 g of HEMA, and 0.2 g of AIBN as a polymerization catalyst were dissolved in 50.7 g of PM, and the resultant solution was reacted at 70° C. for 20 hours to obtain an acrylic copolymer solution (solid content concentration: 25% by mass) (P3). Mn and Mw of the obtained acrylic copolymer were 19,600 and 45,200, respectively.

Synthesis Example 4

50.0 g of CIN2 and 1.0 g of AIBN as a polymerization catalyst were dissolved in 138.9 g of PMA, and the resultant solution was reacted at 85° C. for 20 hours to obtain a specific copolymer solution (solid content concentration: 27% by mass) (P4). Mn and Mw of the obtained specific copolymer were 12,300 and 25,050, respectively.

Examples 1 to 6

Each of the cured-film formation compositions of Examples 1 to 6 and Comparative Examples 1 and 2 was prepared according to the formulation given in Table 1, and the alignment property and the alignment direction of each thereof were evaluated.

In Table 1, Component (A) corresponds to an acrylic copolymer having a photodimerizable moiety and a thermally cross-linkable moiety of the component (A) described above. Component (B) corresponds to a cross-linking agent of the component (B) described above. Component (C) corresponds to a cross-linking catalyst of the component (C) described above. Component (D) corresponds to a low molecular alignment component of the component (D) described above. Component (E) corresponds to another polymer component of the component (E) described above.

TABLE 1

|  | Component (A) (g) | Component (B) (g) | Component (C) (g) | Component (D) | Component (E) (g) | Solvent (g) |
|---|---|---|---|---|---|---|
| Example 1 | P1 5 | HMM 1.35 | PPTS 0.13 | — | — | PM 50.1 |
| Example 2 | P2 5 | HMM 1 | PPTS 0.1 | — | — | PM 35.9 |
| Example 3 | P2 2.5 | HMM 1 | PPTS 0.1 | — | P3 2 | PM 36.4 |
| Example 4 | P2 5 | HMM 1 | PPTS 0.1 | CIN3 0.05 | — | PM 36.9 |
| Example 5 | P2 5 | HMM 1 | PPTS 0.1 | CIN3 0.1 | — | PM 37.8 |
| Example 6 | P2 5 | HMM 1 | PPTS 0.13 | CIN3 0.15 | — | PM 38.9 |
| Comparative Example 1 | — | HMM 1 | PPTS 0.13 | CIN3 0.5 | P3 3 | PM 43 |
| Comparative Example 2 | P4 5 | — | — | — | — | PM 15 |

[Evaluation of Alignment Property]

A substrate comprising an alkali-free glass was spin coated with each of the cured-film formation compositions of Examples and Comparative Examples by a spin coater at 2,000 rpm for 30 seconds, and then the resultant film was heated and dried at 140° C. for 120 seconds on a hot plate to form a cured film. Each of the cured films on the substrates was vertically irradiated at 2 mJ/cm$^2$ with linearly polarized light of 313 nm. Cured films were prepared in the same manner as described above, and the respective cured films on the substrates were irradiated at 5 mJ/cm$^2$, 10 mJ/cm$^2$, 20 mJ/cm$^2$, 40 mJ/cm$^2$, and 80 mJ/cm$^2$ with linearly polarized light to prepare cured films for which different amounts of light exposure were used.

Each of the cured films after the exposure was coated with a polymerizable liquid crystal solution RMS03-013C for horizontal alignment manufactured by Merck Ltd., Japan by a spin coater, and then the resultant coating was prebaked on a hot plate at 60° C. for 60 seconds to form a coating film having a film thickness of 1.0 µm. This substrate was exposed to diffusion light of 365 nm at 300 mJ/cm$^2$ to fabricate a retardation material.

A retardation characteristic was evaluated for each of the retardation materials by sandwiching each of them between cross-Nicole-arranged plates and measuring under transmission observation by using a polarizing microscope to evaluate an alignment property thereof. When the relative luminance observed by using the polarizing microscope was 10 or less, it was determined that uniformly oriented good alignment was formed on the retardation material.

[Evaluation of Alignment Direction]

Each of the substrates on which retardation materials fabricated for the evaluation of alignment property were formed was sandwiched between a linearly polarizing plate and a circular polarizing plate. Whether the alignment direction of the retardation material was in a parallel direction (indicated as "Parallel" in Table 2), or in an orthogonal direction (indicated as "Orthogonal" in Table 2), or in a mixed state thereof (indicated as "Mixed" in Table 2) to the direction of exposure to polarized light at the time of fabricating the cured film was evaluated.

[Evaluation of Pattern Formability]

A substrate comprising an alkali-free glass was spin coated with each of the cured-film formation compositions of Examples and Comparative Examples by a spin coater at 2,000 rpm for 30 seconds, and then the resultant film was heated and dried at 140° C. for 120 seconds on a hot plate to form a cured film. A stripe-patterned mask having the region of 100% transmittance and the region of 2% transmittance was used as a gray tone mask (the line width was 350 µm), and the formed cured film was vertically irradiated at 100 mJ/cm$^2$ with linearly polarized light of 313 nm through the stripe-patterned mask.

The substrate after exposure was coated with a polymerizable liquid crystal solution RMS03-013C for horizontal alignment manufactured by Merck Ltd., Japan by a spin coater, and then the resultant coating was prebaked on a hot plate at 60° C. for 60 seconds to form a coating film having a film thickness of 1.0 µm. This substrate was exposed to diffusion light of 365 nm at 300 mJ/cm$^2$ to fabricate a retardation material. The retardation material was sandwiched between a linearly polarizing plate and a circular polarizing plate, and the pattern formability was evaluated. When the alignment directions of adjacent patterns were orthogonally crossed, the pattern was evaluated as "○", and when one line was not aligned, or adjacent patterns were aligned in the same direction, the pattern was evaluated as "x".

[Evaluation Results]

All results of the above-described evaluations are given in Table 2 below. In Table 2, numeric values listed in upper columns of the columns of "alignment property (upper column) and alignment direction (lower column)" refer to luminance obtained in the evaluations of alignment properties.

TABLE 2

| | Light Exposure = 2 mJ/cm$^2$ | Light Exposure = 5 mJ/cm$^2$ | Light Exposure = 10 mJ/cm$^2$ | Light Exposure = 20 mJ/cm$^2$ | Light Exposure = 40 mJ/cm$^2$ | Light Exposure = 80 mJ/cm$^2$ | Pattern Formation |
|---|---|---|---|---|---|---|---|
| | Alignment Property (Upper Column) and Alignment Direction (Lower Column) | | | | | | |
| Example 1 | 5.9 Orthogonal | 7.8 Orthogonal | 47 Orthogonal | 263 Mixed | 235 Mixed | 2 Parallel | ○ |
| Example 2 | 2.8 Orthogonal | 3.2 Orthogonal | 27 Orthogonal | 270 Mixed | 195 Mixed | 2.3 Parallel | ○ |
| Example 3 | 3.4 Orthogonal | 3.9 Orthogonal | 31 Orthogonal | 253 Mixed | 188 Mixed | 2.2 Parallel | ○ |
| Example 4 | 3.1 Orthogonal | 3.8 Orthogonal | 193 Orthogonal | 145 Mixed | 5.3 Parallel | 2.5 Parallel | ○ |
| Example 5 | 4.3 Orthogonal | 5.6 Orthogonal | 182 Mixed | 8.4 Mixed | 2.1 Parallel | 2.1 Parallel | ○ |
| Example 6 | 3.8 Orthogonal | 46 Orthogonal | 122 Mixed | 2.2 Parallel | 2.4 Parallel | 1.9 Parallel | ○ |
| Comparative Example 1 | 212 Parallel | 3 Parallel | 2.1 Parallel | 1.8 Parallel | 1.7 Parallel | 1.7 Parallel | x |
| Comparative Example 2 | 204 Parallel | 195 Parallel | 193 Parallel | 23 Parallel | 4.2 Parallel | 2.3 Parallel | x |

In Examples 1 to 6, it was confirmed that uniform alignment states were obtained in each of the low light exposure side and the high light exposure, and alignment directions were reversed in the middle range thereof. Specifically, it was confirmed that in the cured films, the direction for regulating liquid crystal alignment varied depending on whether an amount of exposure to polarized light was more or less than the middle range serving as a boundary, and accordingly, the retardation materials having different alignment directions were able to be formed.

It was also confirmed that the retardation materials having two types of retardation regions that were alternately aligned and retardation directions of which were orthogonally crossed each other were formed by using a gray tone mask and performing one-time exposure.

Comparative Examples 1 and 2 showed poor alignment property of the retardation materials for low light exposure. The alignment direction was uniform irrespective of the amount of exposure to polarized light. Accordingly, retardation materials could not be formed by performing one-time exposure to polarized light.

DESCRIPTION OF THE REFERENCE NUMERALS

1 and 1000 Substrate
2 Cured film
3 Gray tone mask
4 Polarized light
1001 Coating film
1002 and 1003 Photomask
1004 First polarized light
1005 Second polarized light

INDUSTRIAL APPLICABILITY

The cured-film formation composition used in the present invention is very useful as a liquid crystal alignment film for a liquid crystal display element or an orientation material for forming an optically anisotropic film that is provided inside or outside a liquid crystal display element, and is particularly suitable as a material for forming a patterned retardation material for a 3D display. Furthermore, the cured-film formation composition is suitable as a material for forming a cured film such as a protective film, a planarization film, and an insulation film in various displays such as a thin film transistor (TFT) liquid crystal display element and an organic EL element, particularly as a material for forming an interlayer insulation film of a TFT liquid crystal element, a protective film for a color filter, an insulation film of an organic EL element, or the like.

The invention claimed is:

1. A method for manufacturing an orientation material having a first orientation region and a second orientation region, in which directions for regulating liquid crystal alignment are different from each other, the method comprising the steps of:
    forming a coating film by applying a cured-film formation composition containing a component (A) that is an acrylic copolymer having a photodimerizable moiety and a thermally cross-linkable moiety and a component (B) that is a cross-linking agent onto a substrate;
    heating the coating film to form a cured film on the substrate; and
    performing exposure to polarized light by irradiating a first region for forming the first orientation region and a second region for forming the second orientation region of the cured film at the same time with polarized light having the same polarization direction such that amounts of light exposure are different between the first region and the second region.

2. The method for manufacturing an orientation material according to claim 1, wherein
    the photodimerizable moiety of the component (A) of the cured-film formation composition is a cinnamoyl group.

3. The method for manufacturing an orientation material according to claim 1, wherein
    the thermally cross-linkable moiety of the component (A) of the cured-film formation composition is a hydroxy group.

4. The method for manufacturing an orientation material according to claim 1, wherein
    the cross-linking agent of the component (B) of the cured-film formation composition is a cross-linking agent having a methylol group or an alkoxymethylol group.

5. The method for manufacturing an orientation material according to claim 1, wherein
the cured film is a film in which a direction for regulating liquid crystal alignment varies depending on an amount of light exposure in the step of performing exposure to polarized light.

6. The method for manufacturing an orientation material according to claim 1, wherein
the cured film is a film in which a direction for regulating liquid crystal alignment varies depending on whether an amount of exposure to polarized light is more or less than a standard amount of light.

7. The method for manufacturing an orientation material according to claim 1, wherein
in the step of performing exposure to polarized light, a photomask formed so as to have a transmissive region and a semi-transmissive region whose light transmittance is lower than that of the transmissive region is used so that each of the first region and the second region of the cured film is exposed to polarized light such that amounts of light exposure are different between the first region and the second region.

8. The method for manufacturing an orientation material according to claim 1, wherein
the cured-film formation composition contains a low molecular alignment component as a component (D).

9. An orientation material being obtained by the method for manufacturing an orientation material as claimed in claim 1.

10. A method for manufacturing a retardation material using the orientation material as claimed in claim 9.

11. A retardation material being obtained by the method for manufacturing a retardation material as claimed in claim 10.

* * * * *